(12) United States Patent
Shrestha et al.

(10) Patent No.: US 11,812,473 B2
(45) Date of Patent: Nov. 7, 2023

(54) RANDOM ACCESS PROCEDURES FOR NEW RADIO (NR) NETWORKS

(71) Applicant: QUALCOMM Incorporated, San Diego, CA (US)

(72) Inventors: Bharat Shrestha, San Diego, CA (US); Umesh Phuyal, San Diego, CA (US); Alberto Rico Alvarino, San Diego, CA (US); Xiao Feng Wang, San Diego, CA (US); Prasad Reddy Kadiri, San Diego, CA (US); Le Liu, Fremont, CA (US); Liangping Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 17/165,272

(22) Filed: Feb. 2, 2021

(65) Prior Publication Data

US 2021/0251012 A1 Aug. 12, 2021

Related U.S. Application Data

(60) Provisional application No. 62/971,821, filed on Feb. 7, 2020.

(51) Int. Cl.
*H04W 74/08* (2009.01)
*H04W 56/00* (2009.01)
(Continued)

(52) U.S. Cl.
CPC ... *H04W 74/0833* (2013.01); *H04W 56/0005* (2013.01); *H04W 56/0045* (2013.01); *H04W 72/23* (2023.01); *H04W 74/006* (2013.01)

(58) Field of Classification Search
None
See application file for complete search history.

(56) References Cited

U.S. PATENT DOCUMENTS 10,122,521 B2 * 11/2018 Ziren ............... H04W 56/0065
10,271,375 B1 * 4/2019 Park ....................... H04W 76/22
(Continued)

FOREIGN PATENT DOCUMENTS

GB 2572336 A 10/2019

OTHER PUBLICATIONS

CATT: "PRACH Design and UL Timing Management", 3GPP TSG RAN WG1 Meeting #98bis, 3GPP Draft; R1-1910338, 3rd Generation Partnership Project (3GPP), RAN WG1, Chongqing, China; Oct. 14, 2019-Oct. 20, 2019, Oct. 5, 2019 (Oct. 5, 2019), 10 Pages, XP051808519, Retrieved from the Internet: URL: https://ftp.3gpp.org/tsg_ran/WG1_RL1/TSGR1_98b/Docs/R1-1910338.zip, R1-1918338.docx [retrieved on Oct. 5, 2019].
(Continued)

*Primary Examiner* — Gregory B Sefcheck
(74) *Attorney, Agent, or Firm* — Seyfarth Shaw LLP

(57) ABSTRACT

A method of wireless communication by a user equipment (UE) calculates a propagation delay for sending a message from the UE to a network node, such as a base station, via non-terrestrial communications. The method sends a random access preamble to the base station while accounting for the calculated propagation delay. The method starts a random access response (RAR) window at a first physical downlink control channel (PDCCH) occasion after twice the calculated propagation delay from sending the random access preamble. The method receives a random access response (RAR) message from the base station during the RAR window. The RAR message includes an uplink grant indicating an uplink shared channel resource. Further, the method sends an uplink message to arrive during the uplink shared channel resource while accounting for the calculated propagation delay.

22 Claims, 14 Drawing Sheets

(51) Int. Cl.
*H04W 72/23* (2023.01)
*H04W 74/00* (2009.01)

(56) References Cited

U.S. PATENT DOCUMENTS

| | | | | |
|---|---|---|---|---|
| 10,547,374 | B1* | 1/2020 | Liu | H04W 72/14 |
| 11,031,999 | B1* | 6/2021 | Liu | H04W 72/10 |
| 11,304,168 | B2* | 4/2022 | Jeon | H04W 76/40 |
| 2008/0062935 | A1* | 3/2008 | Nakagawa | H04L 7/042 370/335 |
| 2010/0278137 | A1* | 11/2010 | Kwon | H04W 74/0833 370/329 |
| 2017/0231011 | A1* | 8/2017 | Park | H04W 74/0841 |
| 2018/0248736 | A1* | 8/2018 | Davydov | H04W 76/27 |
| 2018/0376501 | A1* | 12/2018 | John Wilson et al. | H04W 72/1273 |
| 2019/0342845 | A1* | 11/2019 | Laselva | H04L 1/1812 |
| 2020/0099490 | A1* | 3/2020 | Sridharan | H04L 5/0082 |
| 2020/0107235 | A1* | 4/2020 | Peisa | H04W 74/02 |
| 2020/0252895 | A1* | 8/2020 | Yi | H04W 72/0446 |
| 2020/0295824 | A1* | 9/2020 | Charbit | H04L 1/1887 |
| 2020/0305188 | A1* | 9/2020 | Liu | H04W 74/08 |
| 2020/0404713 | A1* | 12/2020 | Sakhnini | H04W 74/0833 |
| 2021/0045163 | A1* | 2/2021 | Chai | H04W 74/006 |
| 2021/0105748 | A1* | 4/2021 | Chen | H04B 7/0626 |
| 2021/0144581 | A1* | 5/2021 | Tripathi | H04W 8/26 |
| 2021/0168869 | A1* | 6/2021 | Gupta | H04B 7/1851 |
| 2021/0175964 | A1* | 6/2021 | Kusashima | H04W 56/005 |
| 2021/0227591 | A1* | 7/2021 | Iwai | H04L 27/2607 |
| 2021/0321464 | A1* | 10/2021 | Lin | H04W 76/11 |
| 2021/0345280 | A1* | 11/2021 | Zhang | H04W 72/1268 |
| 2021/0400724 | A1* | 12/2021 | Liu | H04W 74/0833 |
| 2022/0046711 | A1* | 2/2022 | Kronander | H04W 74/0833 |
| 2022/0086786 | A1* | 3/2022 | Narasimha | H04W 56/0065 |
| 2022/0095258 | A1* | 3/2022 | Yeo | H04W 72/042 |
| 2022/0104277 | A1* | 3/2022 | Narasimha | H04L 5/0053 |
| 2022/0110161 | A1* | 4/2022 | Christoffersson | H04W 74/0833 |

OTHER PUBLICATIONS

International Search Report and Written Opinion—PCT/US2021/016324—ISA/EPO—dated May 31, 2021.
ZTE., et al., "Random Access Procedure and RACH Capacity in NTN", 3GPP TSG-RAN WG2 Meeting #106, 3GPP Draft; R2-1908246 Random Access Procedure and RACH Capacity in NTN_V1, 3rd Generation Partnership Project (3GPP), RAN WG2, Reno, USA; May 13, 2019-May 17, 2019, May 18, 2019 (May 18, 2019), 14 Pages, XP051740399, Retrieved from the Internet: URL: http://www.3gpp.org/ftp/tsg%5Fran/WG2%5FRL2/TSGR2%5F106/Docs/R2%2D1908246%2Ezip, [retrieved on May 18, 2019].

* cited by examiner

RANDOM ACCESS PROCEDURES FOR NEW RADIO (NR) NETWORKS

CROSS-REFERENCE TO RELATED APPLICATION

The present application claims the benefit of U.S. Provisional Patent Application No. 62/971,821, filed Feb. 7, 2020, and titled "RANDOM ACCESS PROCEDURES FOR NEW RADIO (NR) NON-TERRESTRIAL NETWORKS," the disclosure of which is expressly incorporated by reference herein in its entirety.

INTRODUCTION

The present disclosure relates generally to wireless communications, and more specifically to random access procedures for wireless networks, such as non-terrestrial networks (NTNs).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), orthogonal frequency division multiplexing (OFDM), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some examples of wireless communications systems may be non-terrestrial networks, which may utilize satellites and high-altitude platforms (e.g., drones) as relay devices in communication with ground devices. Alternatively, the satellites and high-altitude platforms may operate themselves as base stations. In non-terrestrial networks, the propagation delay of wireless transmissions may be large compared to terrestrial wireless network transmissions. In some cases, techniques for random access to enable wireless communications in terrestrial wireless networks may need to be improved for non-terrestrial networks. Therefore, future solutions are desired.

SUMMARY

In one aspect of the present disclosure, a method of wireless communication by a user equipment (UE), includes receiving information to estimate a propagation delay between the UE and a network node accessed via non-terrestrial communications. The method further includes transmitting, to the network node, a physical random access channel (PRACH) preamble a user specific timing advance period before a random access channel (RACH) occasion at the UE, the user specific timing advance period corresponding to the propagation delay.

Another aspect of the present disclosure is directed to an apparatus for a UE for wireless communication. The apparatus includes means for receiving information to estimate a propagation delay between the UE and a network node accessed via non-terrestrial communications. The apparatus further includes means for transmitting, to the network node, a physical random access channel (PRACH) preamble a user specific timing advance period before a random access channel (RACH) occasion at the UE, the user specific timing advance period corresponding to the propagation delay.

In another aspect of the present disclosure, a non-transitory computer-readable medium with program code recorded thereon is disclosed. The program code is executed by a processor and includes program code to receive information to estimate a propagation delay between the UE and a network node accessed via non-terrestrial communications. The program code further includes program code to transmit, to the network node, a physical random access channel (PRACH) preamble a user specific timing advance period before a random access channel (RACH) occasion at the UE, the user specific timing advance period corresponding to the propagation delay.

Another aspect of the present disclosure is directed to an apparatus for a UE for wireless communication. The apparatus includes a memory and one or more processors coupled to the memory. The memory and one or more processor may be configured to receive information to estimate a propagation delay between the UE and a network node accessed via non-terrestrial communications. The memory and one or more processor may be further configured to transmit, to the network node, a physical random access channel (PRACH) preamble a user specific timing advance period before a random access channel (RACH) occasion at the UE, the user specific timing advance period corresponding to the propagation delay.

In one aspect of the present disclosure, a method of wireless communication by a network node in a non-terrestrial network includes transmitting, to a user equipment (UE), information for estimating a propagation delay between the UE and the network node. The method further includes receiving, from the UE, a physical random access channel (PRACH) preamble a user specific timing advance period after the UE transmits the PRACH preamble, the user specific timing advance period corresponding to the propagation delay.

Another aspect of the present disclosure is directed to an apparatus for a network node in a non-terrestrial network. The apparatus includes means for transmitting, to a user equipment (UE), information for estimating a propagation delay between the UE and the network node. The apparatus further includes means for receiving, from the UE, a physical random access channel (PRACH) preamble a user specific timing advance period after the UE transmits the PRACH preamble, the user specific timing advance period corresponding to the propagation delay.

In another aspect of the present disclosure, a non-transitory computer-readable medium has program code recorded thereon for a network node in a non-terrestrial network. The program code is executed by a processor and includes program code to transmit, to a user equipment (UE), information for estimating a propagation delay between the UE and the network node. The program code further includes program code to receive, from the UE, a physical random access channel (PRACH) preamble a user specific timing advance period after the UE transmits the PRACH preamble, the user specific timing advance period corresponding to the propagation delay.

Another aspect of the present disclosure is directed to an apparatus for a network node in a non-terrestrial network. The apparatus has a memory and one or more processors coupled to the memory. The memory and one or more processor may be configured to transmit, to a user equipment (UE), information for estimating a propagation delay between the UE and the network node. The memory and one or more processor may be further configured to receive, from the UE, a physical random access channel (PRACH) preamble a user specific timing advance period after the UE transmits the PRACH preamble, the user specific timing advance period corresponding to the propagation delay.

The described techniques relate to improved methods, systems, devices, and apparatuses that support random access procedures for non-terrestrial networks. Generally, the described techniques provide for a wireless communications system that may be a non-terrestrial network, which may include a base station (e.g., a gateway), a user equipment (UE), and a satellite in wireless communications with the base station and the UE, among other components. In some cases, the base station may be integrated or located on board the satellite.

Some examples of the method, apparatuses, and non-transitory computer-readable medium described herein may further include operations, features, means, or instructions for generating a configuration for the UE including a reference signal (RS) periodicity, an indication of a symbol of a slot, and an indication of frequency resources for the upstream transmission, and transmitting the configuration to the UE during a connection procedure with the UE.

DETAILED DESCRIPTION

Figure 1:
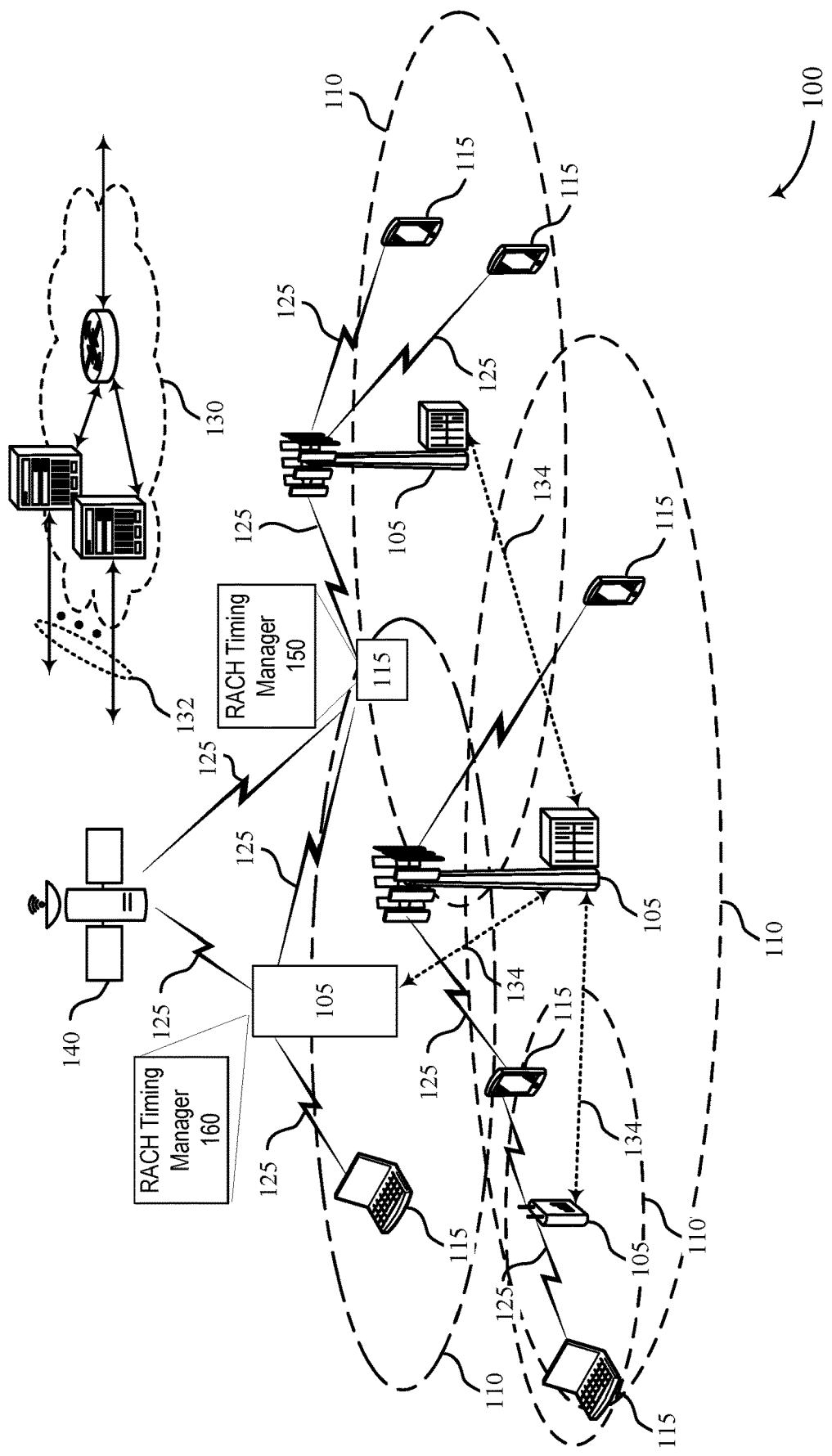
FIG. 1 illustrates an example of a wireless communications system that supports random access procedures for non-terrestrial networks, in accordance with one or more aspects of the present disclosure.

A wireless communications system may be a non-terrestrial network including a base station that may utilize a satellite (e.g., a non-geostationary satellite) to relay communications to one or more user equipment (UEs). In other scenarios, the satellite may operate as a base station. Due to the mobility of the satellite, the communications may experience timing errors (e.g., variation in propagation delay). Some techniques for random access related to wireless transmissions in terrestrial wireless networks may need to be improved for non-terrestrial networks. According to one or more techniques described, the base station and the UEs in wireless communication with the satellite may support random access procedures for addressing propagation delay due to the mobility of the UEs and the satellite.

Aspects of the present disclosure provide techniques to align random access channel (RACH) occasions between the UE and the network node (e.g., eNB/gNB (also referred to as a base station)). In some aspects of the present disclosure, a UE may estimate a one way propagation delay from the UE to a satellite and from the satellite to a ground base station. In other aspects, a random access response (RAR) window timing is set based on a downlink (DL) propagation delay. One or more examples address uplink (UL) grant handling in the RAR (e.g., message two (Msg2) of the random access procedure) where in one example the RAR includes an uplink grant. In this example, message three (Msg3) of the random access procedure may be transmitted based on the uplink grant of the RAR.

Various options are available for the UE to estimate the total one way propagation delay. In one option, the UE may estimate the total one way propagation delay by using a time stamp provided in a synchronization signal block (SSB), physical broadcast channel (PBCH), or a system information broadcast (SIB) message. For example, the time stamp may be provided in a system information block one (SIB1) message and/or an NTN specific SIB message. The UE may estimate the propagation delay based on the time stamp and time of reception. In another option, the UE may estimate the total one way propagation delay by using universal time for subframe number (SFN) timing. For example, the UTC (coordinated universal time) starting at a specific time may be assigned to system frame number zero (SFN 0). The UE can estimate the propagation delay based on the boundary of the SFN 0. An indication of whether the cell is using coordinated universal time for SFN timing may be provided in a SIB message. In some aspects, the indication may be provided if the base station is not following the specific time reference.

To enable preamble transmission, according to one or more aspects of the present disclosure, each UE may estimate the base station's SFN based on satellite ephemeris data and each UE's respective location. Then, each UE may calculate the one way propagation delay time (D) between the UE and base station. Each UE may transmit the physical random access channel (PRACH) preamble "D" time units before the start of the RACH occasion at the gNB side. Thus, each UE has a UE specific timing advance. In other words, each UE may pre-compensate for the delay when sending its preamble. In one example, if the UE's RACH occasion (RO) is D time units after the gNB's RO, the preamble is transmitted 2*D time units earlier than the UE's RO.

In one or more examples, after receiving the preambles, the base station may start a random access response (RAR) window, during which the base station may transmit RARs to each UE. According to one or more aspects of the present disclosure, each UE may start a random access response (RAR) receiving window at the first physical downlink control channel (PDCCH) occasion after twice the UE specific timing advance (e.g., 2*D) from the end of the random access preamble transmission.

One or more aspects of the present disclosure are directed to scheduling the physical uplink shared channel (PUSCH). In some aspects, the PUSCH scheduling window for the base station may start a period T after the start of the base station RAR window. In one example, the period T is the gap between the RAR window and the earliest PUSCH location for the base station.

According to one or more aspects of the present disclosure, the period T may be calculated as:

$$T=2*D\text{max}+\text{RAR window}+\text{TA (timing advance)},$$

where Dmax is the maximum one way propagation delay time from any UE to the base station in a given cell. In other words, in one example, Dmax may correspond to the propagation delay for the farthest UE from the base station. The timing advance value, TA, may be assumed to be with respect to the downlink (DL) reference timing. The RAR window may be the duration of the window for receiving and processing an RAR.

According to one example, the earliest time when a UE can transmit Msg3 in a PUSCH may be D time units before the start of the PUSCH scheduling window. In other aspects of the present disclosure, the UE may be scheduled with random resources and the UE may select the best resources, as described in more detail below.

According to one or more aspects of the present disclosure, periodic pre-allocated uplink (UL) (e.g., PUSCH) resources may be used to transmit Msg3. In one example, the periodic allocation may be in lieu of a resource indicated in the RAR message (Msg2). The starting point of the pre-allocated periodic PUSCH resources may be the time (Dmin+TA) from the end of the RAR message or a RAR window, delayed by the minimum propagation delay (Dmin). The parameter Dmin may be the minimum one way propagation delay time from the UE to the base station in the given cell, in other words, the propagation delay from the closest UE to the base station. In this aspect of the present disclosure, the UE may select the first available resource.

In still other aspects, a UE may indicate an amount of its delay in its preamble. That is, the preamble may inform the network about the UE specific delay. In accordance with these aspects, the PUSCH may be scheduled according to a delay group. For example, UEs may be grouped according to their respective delays. For example, the preambles may be partitioned into X groups to consider X one way propagation delay times (D1, D2, . . . DX) where DX=Dmax/X. The start of the PUSCH scheduling window may be calculated based on a group ID corresponding to the preamble the base station receives. In other words, the preamble may inform the network about the delay. The network may schedule the PUSCH according to the delay group. In these aspects, a UE with a one way propagation delay D, such that D2<D<=D1, may use the preamble group corresponding to D1.

According to one or more examples of the present disclosure, all UEs may have the same timing advance, instead of UE specific timing advances. For example, the delay Dmax may be assigned to each UE. In these aspects, the base station may not receive the preambles from all of the UEs at the same time. Each UE may transmit at its own RACH opportunity (RO). Thus, the base station may set a preamble receiving window to receive the preambles from all possible UEs. This option may be used for UEs with or without GNSS capability.

The techniques mentioned above and described in more detail below enable random access procedures within a non-terrestrial network. Although aspects of the disclosure are initially described in the context of a non-terrestrial network, it is noted that aspects of the present disclosure apply to terrestrial networks where propagation delay may be an issue, in addition to non-terrestrial networks. Aspects of the disclosure are illustrated by and described with reference to a process flow. Aspects of the disclosure are further illustrated by and described with reference to apparatus diagrams, system diagrams, and flowcharts that relate to random access procedures for networks, such as non-terrestrial networks.

FIG. 1 illustrates an example of a wireless communications system 100 that supports random access procedures for non-terrestrial networks, in accordance with one or more aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. The wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in the wireless communications system 100 may include upstream transmissions from a UE 115 to a base station 105, or downstream transmissions from a base station 105 to a UE 115. Downstream transmissions may also be called downlink or forward link transmissions while upstream transmissions may also be called uplink or reverse link transmissions.

The geographic coverage area 110 for a base station 105 may be divided into sectors each making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier) or a satellite beam, and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

The wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

The wireless communications system 100 may also operate in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed may be employed across transmissions that use one or more different frequency regions, and designated use of bands across these frequency regions may differ by country or regulating body.

In some cases, the wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data.

In some cases, operations in unlicensed bands may be based on a CA configuration in conjunction with CCs operating in a licensed band (e.g., LAA). Operations in unlicensed spectrum may include downstream transmissions, upstream transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, the wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, the wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $Ts=1/30,720,000$ seconds. Time intervals of a communications resource may be organized according to radio frames each having a duration of 10 milliseconds (ms), where the frame period may be expressed as $T_f=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix (CP) prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling.

A carrier may be associated with a pre-defined frequency channel (e.g., an E-UTRA absolute radio frequency channel number (EARFCN)) and may be positioned according to a channel raster for discovery by UEs 115. Carriers may be downstream or upstream (e.g., in an FDD mode), or be configured to carry downstream and upstream communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downstream carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that can support simultaneous communications via carriers associated with more than one different carrier bandwidth.

The wireless communications system 100 may support communication with a UE 115 on multiple cells or carriers, a feature which may be referred to as carrier aggregation (CA) or multi-carrier operation. A UE 115 may be configured with multiple downstream CCs and one or more upstream CCs according to a carrier aggregation configuration. Carrier aggregation may be used with both FDD and TDD component carriers.

In some cases, the wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some examples, the wireless communications system 100 may be or be related to a terrestrial network. Some examples of terrestrial networks may include NR systems, for example, including base stations 105 and UE s 115. Within an NR system, upstream transmissions (e.g., CP-OFDM or DFT-S-OFDM waveforms) may arrive at a base station 105 from a UE 115 within an interval time, for example, within a CP duration. For subcarrier spacing of 120 kHz, the CP duration may be approximately 0.59 µs. Additionally, subcarrier spacing for mmW communications within Ka band such as, downstream transmissions between approximately 20 GHz and 30 GHz may be greater compared to upstream transmissions. For example, the subcarrier spacing greater than 120 kHz may improve communication reliability due to frequency error as a result of Doppler. In this example, a subcarrier spacing greater than 120 kHz may result in a CP duration of 0.25 µs.

In some examples, the wireless communications system 100 may additionally, or alternatively, be or be related to a non-terrestrial network. For example, the base stations 105 may utilize the satellite 140 to relay communications to the UEs 115. Due to the mobility of the satellite 140 and the distance from the satellite 140 to the UEs 115, the communications may experience upstream timing errors (e.g., downstream timing tracking errors, variation in propagation delay). For example, the satellite 140 may be a non-geostationary satellite that may orbit the UEs 115 from 600 km and travel at a speed of approximately 7.6 km/s. As a result, the round-trip time (e.g., an update rate) between the satellite 140 and the UEs 115 may change as much as 50 μs per second.

For example, assuming that an upstream timing is ideal at time t (e.g., without any timing adjustment applied to the time t), approximately 10 ms later, the upstream timing error may be approximately 0.5 μs. As a result, the round-trip time for the satellite 140 may be approximately 30 ms, and a timing advance command calculated based on upstream transmission at time t may be off by 1.5 μs when it arrives at a UE 115. To compensate for the upstream timing error, the base station 105 (also referred to as "a gateway") may provide a timing command to the UEs 115 for upstream transmissions. The UEs 115 may receive the timing command and transmit an upstream transmission to the base station 105 using a timing adjustment indicated in the timing command.

According to one or more aspects of the present disclosure, each of the UEs 115 may include a RACH timing manager 150 to enable use of RACH procedures in NTN scenarios. Although only one of the UEs 115 is shown with the RACH timing manager 150, the manager 150 may be provided to each of the UEs 115. The RACH timing manager 150 may receive information to estimate a propagation delay between the UE 115 and a base station 105 accessed via a satellite 140. The RACH timing module may also transmit, to the base station 105, a physical random access channel (PRACH) preamble a user specific timing advance period before a random access channel (RACH) occasion at the UE 115. The user specific timing advance period corresponds to the estimated propagation delay.

According to one or more aspects of the present disclosure, each of the base stations 105 may include a RACH timing manager 160 to enable use of RACH procedures in NTN scenarios. Although only one of the base stations 105 is shown with the RACH timing manager 160, the manager 160 may be provided to each of the base stations 105. The RACH timing manager 160 may transmit, to a UE 115, information for estimating a propagation delay between the UE 115 and the base station 105, for non-terrestrial communications. The RACH timing manager 160 may also receive, from the UE 115, a PRACH preamble a user specific timing advance period after the UE 115 transmits the PRACH preamble. The user specific timing advance period corresponds to the estimated propagation delay.

Figure 2:
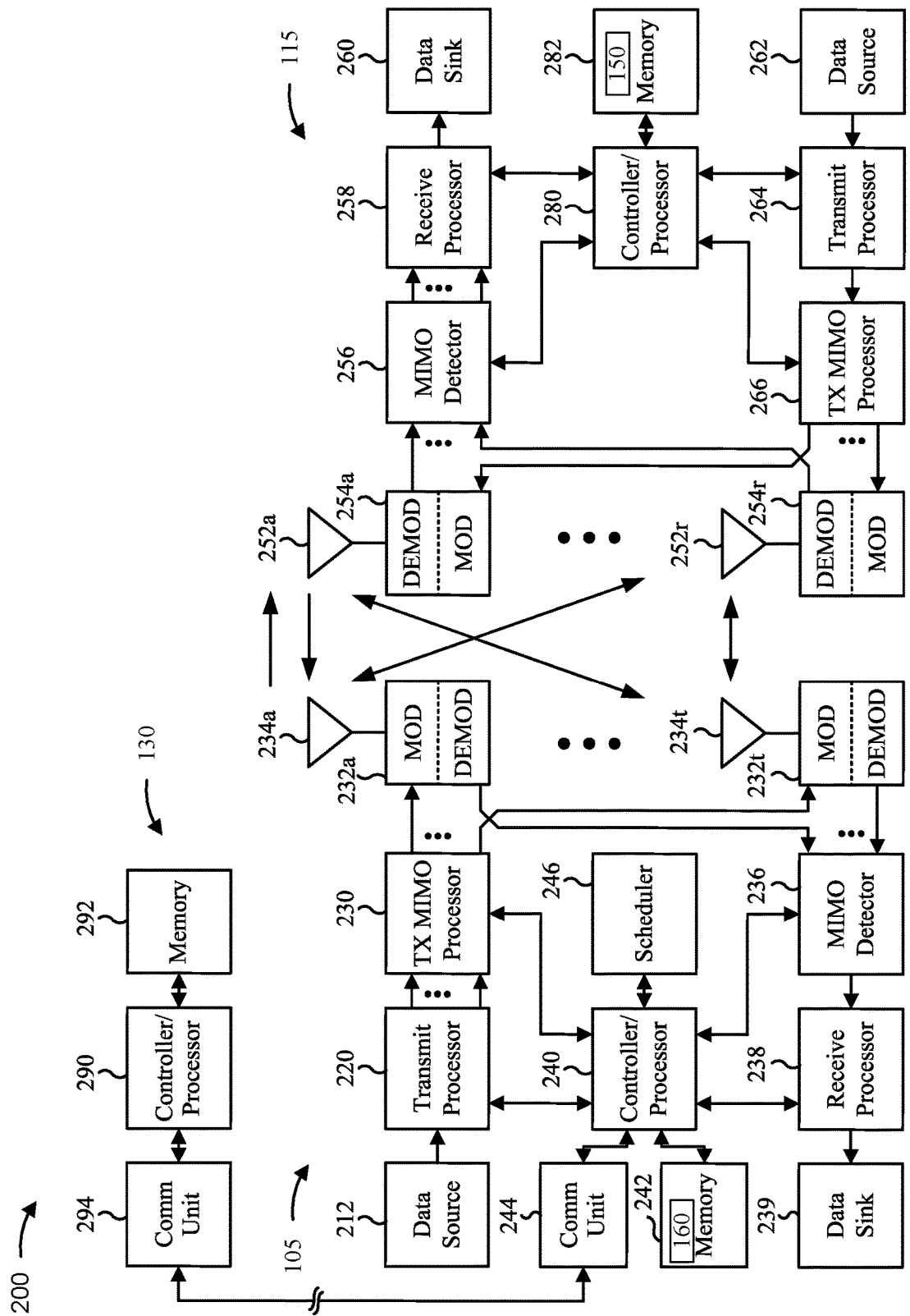
FIG. 2 illustrates an example of a wireless communications system that supports random access procedures for non-terrestrial networks, in accordance with one or more aspects of the present disclosure.

FIG. 2 shows a block diagram of a design 200 of base station 105 and UE 115, which may be one of the base stations and one of the UEs in FIG. 1. Base station 105 may be equipped with T antennas 234a through 234t, and UE 115 may be equipped with R antennas 252a through 252r, where in general T>1 and R>1.

At base station 105, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 115, antennas 252a through 252r may receive the downlink signals from base station 105 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 115 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 115 may be included in a housing.

On the uplink, at UE 115, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 105. At base station 105, the uplink signals from UE 115 and other UEs may be received by antennas 234, processed by demodulators 254, detected by a MIMO detector 236 if applicable, and further processed by a receive processor 238 to obtain decoded data and control information sent by UE 115. Receive processor 238 may provide the decoded data to a data sink 239 and the decoded control information to controller/processor 240. Base station 105 may include communication unit 244 and communicate to network controller 130 via communication unit 244. Network controller 130 may include communication unit 294, controller/processor 290, and memory 292.

Controller/processor 240 of base station 105, controller/processor 280 of UE 115, and/or any other component(s) of FIG. 2 may perform one or more techniques associated with random access procedures, as described in more detail elsewhere. For example, controller/processor 240 of base station 105, controller/processor 280 of UE 115, and/or any other component(s) of FIG. 2 may perform or direct operations of, for example, the methods 1200, 1300 of FIGS. 12 and 13 and/or other processes as described. Memories 242 and 282 may store data and program codes for base station 105 and UE 115, respectively. For example, the memory 292 may store the RACH timing manager 160, and the memory 242 may store the RACH timing manager 150. A scheduler 246 may schedule UEs for data transmission on the downlink and/or uplink.

In some aspects, UE 115 may include means for receiving, means for transmitting, means for starting, and means for entering a sleep state, means for skipping one RACH occasion. The base station 105 can include means for receiving, means for transmitting, means for scheduling, and means for grouping. Such means may include one or more components of the UE 115 or base station 105 described in connection with FIG. 2.

As indicated above, FIG. 2 is provided merely as an example. Other examples may differ from what is described with regard to FIG. 2.

Figure 3:
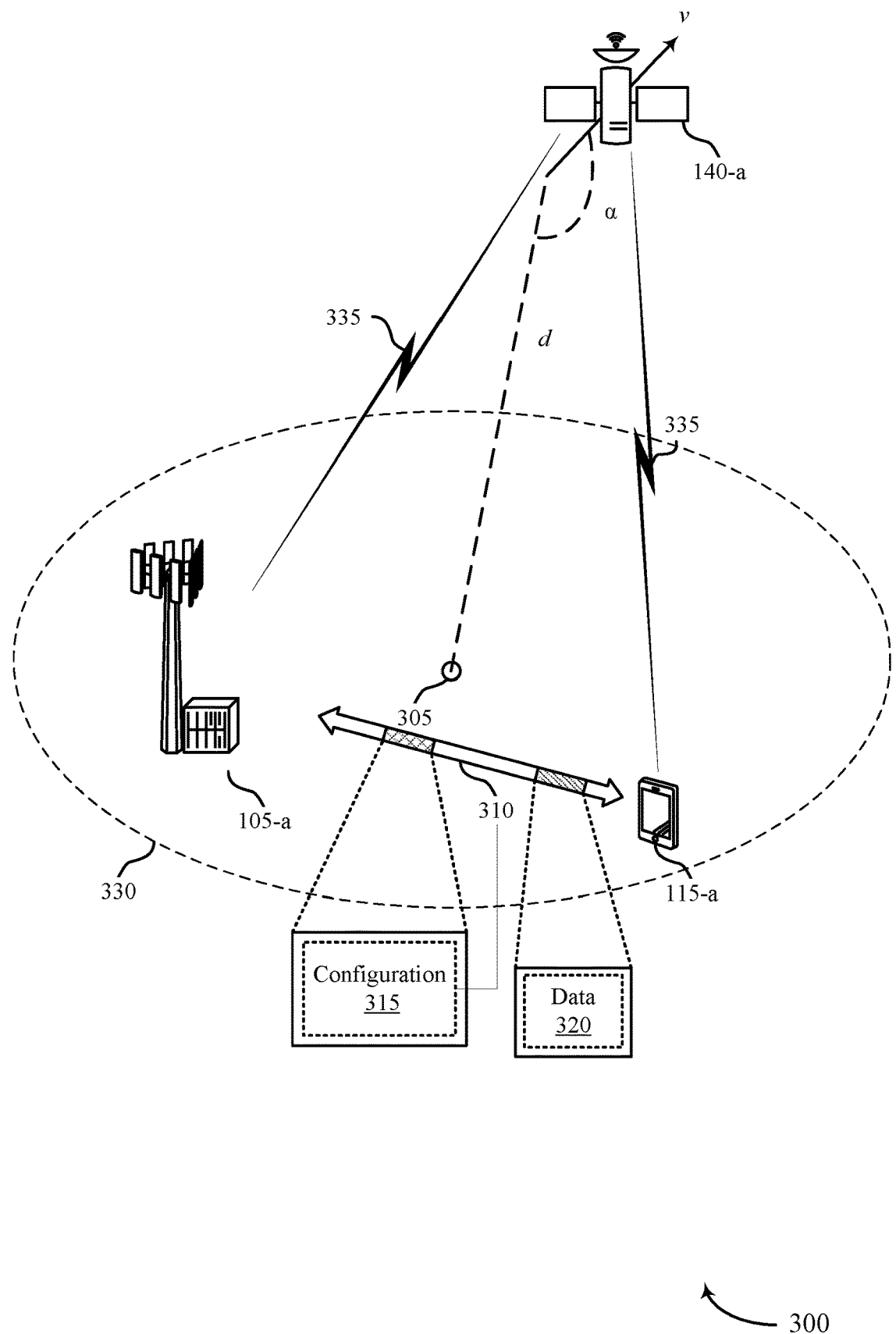
FIG. 3 illustrates an example of a non-terrestrial network that supports random access procedures for non-terrestrial networks, in accordance with one or more aspects of the present disclosure.

FIG. 3 illustrates an example of a wireless communications system 300 that supports random access procedures for non-terrestrial networks in accordance with one or more aspects of the present disclosure. In some examples, the wireless communications system 300 may implement aspects of the wireless communications system 100. The wireless communications system 300 may include a base station 105-a, a UE 115-a, and a satellite 140-a, which may be examples of the corresponding devices described with reference to FIG. 1. For example, the wireless communications system 300 may be a non-terrestrial network, which may include a base station 105-a, a UE 115-a, and a satellite 140-a. The satellite 140-a may relay communications for base stations (e.g., base station 105-a) and mobile terminals (e.g., UE 115-a). The base station 105-a may also be referred to as a gateway. The geographical area associated with a transmission beam of the satellite 140-a may be called a beam footprint 330 and UE 115-a may communicate with the satellite 140-a when the UE 115-a is located within the beam footprint 330.

The base station 105-a may perform a communication procedure (e.g., an RRC procedure, such as a cell acquisition procedure, random access procedure, RRC connection procedure, RRC configuration procedure) with the UE 115-a. The base station 105-a may be configured with multiple antennas, which may be used for directional or beamformed transmissions. As part of the communication procedure, the base station 105-a may establish a bi-directional communication link 310 for communication with the UE 115-a. Additionally, or alternatively, as part of the communication procedure, the base station 105-a may configure the UE 115-a with configuration 315 (e.g., time and frequency resources, a reference signal periodicity, an indication of a symbol of a slot for transmitting reference signals) via RRC signaling. Although shown communicating directly, the present disclosure primarily focuses on when the UE 115-a communicates to the base station 105-a via the satellite 140-a.

The satellite 140-a may generate satellite information (e.g., ephemeris information) associated with communications between the satellite 140-a, the UE 115-a, and the base station 105-a. For example, the satellite 140-a may determine a propagation delay associated with transmissions between the satellite 140-a, the UE 115-a, and the base station 105-a. In some cases, the propagation delay may be based on the distance d from the satellite 140-a to the point 305 (e.g., center) of the beam footprint 330. In other cases, the propagation delay may be a factor of the distance d, which may correspond to the round-trip distance between the base station 105-a and the satellite 140-a. Additionally or alternatively, the propagation delay may be an estimated round trip delay or a round-trip time between the UE 115-a and the base station 105-a, which may be based at least in part on d and/or $2d$. It should be noted that the distance d may not reflect the precise distance from the satellite 140-a to the UE 115-a. For example, the UE 115-a may be located at an edge of the beam footprint 330 and may be a different distance from the satellite 140-a than d. However, such a difference in distance may be insignificant compared to d. Thus, the distance d may be a sufficient representation of the distance from the satellite 140-a to the UE 115-a. More details about estimating delay are described below with reference to FIG. 5.

The satellite 140-a may transmit, via wireless communication links 335, the satellite information to the base station 105-a and/or the UE 115-a, which may be located within the beam footprint 330. In some cases, the satellite 140-a may update and transmit the satellite information to the base station 105-a and/or the UE 115-a at a preconfigured schedule (e.g., an update rate). The preconfigured schedule may be based on a velocity of the satellite 140-a. For example, the velocity of the satellite 140-a may result in a maximum round-trip time variation rate of 50 μs per second. That is, for every second of movement of the satellite 140-a, the round-trip time of communications between the satellite 140-a and the UE 115-a, for example, may vary by 50 μs. The round-trip time variation rate may also vary based on the movement of the satellite (e.g., orbit). In such instances, the satellite 140-a may update the satellite information multiple times every second. Additionally, or alternatively, the base station 105-a may transmit the satellite information to the UE 115-a via the bi-directional communication link 310, for example, as part of the configuration 315. In some cases, the base station 105-a may transmit the satellite information to the UE 115-a based on the preconfigured schedule, for example, the update rate of the satellite 140-a.

The satellite information may also include the velocity of the satellite 140-a. The velocity of the satellite 140-a may, in some cases, be defined by or relate to the following expression v×cos(a), where α is the angle between the vector of velocity v and the vector of distance d. The UE 115-a may use the velocity of the satellite 140-a to determine the round-trip time variation rate. In some cases, the UE 115-a may determine the round-trip time variation rate using the velocity of the satellite 140-a based at least in part on the UE 115-a being located relative to the point 305 of the beam footprint 230. In some examples, using the velocity of the satellite 140-a, the round-trip time variation rate may be defined by the following expression $-2v \times \cos(\alpha)/c$, where a is the angle between the vector of velocity v and the vector of distance d, and c is the speed of light. As such, if an upstream transmission is scheduled to be transmitted at time $t_0$ with a timing adjustment $t_a$, the actual transmission time by the UE 115-a may be $t_0+t_a$. For a subsequent upstream transmission scheduled to be transmitted at time $t_a+\Delta t$ without a new timing adjustment provided by the base station 105-*a*, the actual transmission time by the UE 115-*a* may be $t_a+\Delta t \times (-2v \times \cos(\alpha)/c)$.

When the UE 115-*a* is in the discontinuous reception (DRX) mode and in RRC-idle or RRC-connected, the base station 105-*a* may transmit downlink control information in certain time and frequency resources (e.g., fixed symbols). Between these time and frequency resources, the UE 115-*a* may enter a lower-power state, also referred to as "sleep mode," so as to reduce power consumption and increase battery life for the UE 115-*a*. In RRC-idle or RRC-connected, the UE 115-*a* may wakeup once every number of symbols to receive a downstream transmission from the base station 105-*a* and/or the satellite 140-*a*. The gap periods allocated prior to and following a reference signal transmission may be benefit the base station 105-*a* by reducing or eliminating interferences between the UE 115-*a* transmission and a transmission from another neighboring UE.

Figure 4:
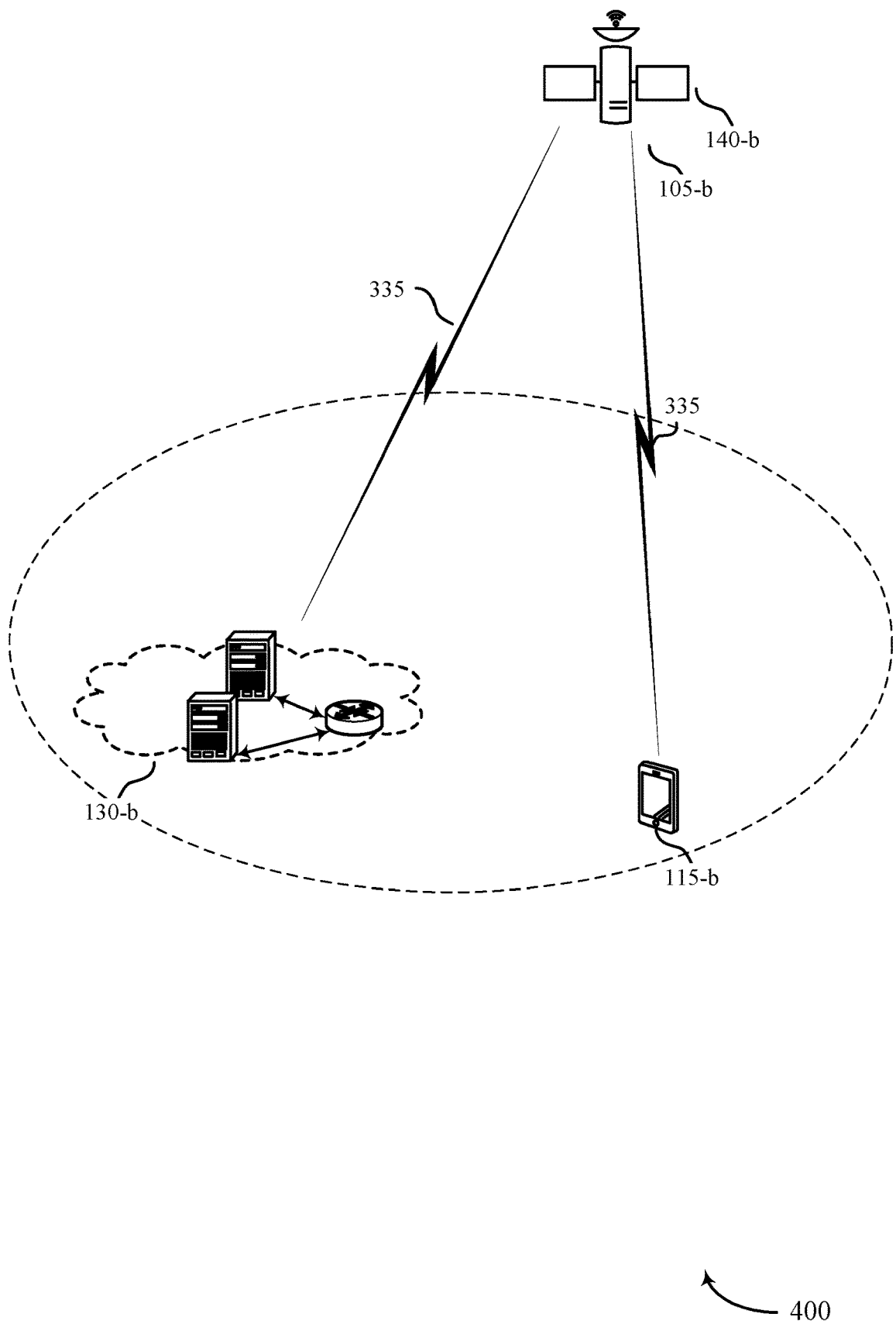
FIG. 4 illustrates an example of a non-terrestrial network that supports random access procedures for non-terrestrial networks, in accordance with one or more aspects of the present disclosure.

FIG. 4 illustrates an example of a non-terrestrial network that supports random access procedures for non-terrestrial networks, in accordance with one or more aspects of the present disclosure. FIG. 4 shows an alternate network configuration. In this configuration, the base station 105-*b* is located on the satellite 140-*b*. The base station 105-*b* communicates with the core network 130-*b* via wireless communication links 335. The UE 115-*b* communicates with the non-terrestrial base station 105*b* via wireless communications links 335.

For non-terrestrial network (NTN) access using 5G NR procedures, a large round trip delay makes it challenging to reuse the random access procedure as is. Enhancements are desired for NR non-terrestrial networks, especially those with nodes in low earth orbit (LEO), medium Earth orbit (MEO) and geostationary orbit (GEO). Such enhancements may also be compatible with high altitude platform station (HAPS) and air-to-ground (ATG) scenarios. An Earth fixed tracking area may be assumed with Earth fixed and moving cells. That is, the UE is stationary, whereas the satellite is mobile. User equipment (UEs) with global navigation satellite system (GNSS) capabilities, such as global positioning system (GPS), may be assumed in some scenarios.

Aspects of the present disclosure provide techniques to align random access channel (RACH) occasions between the UE and the network node (e.g., eNB/gNB (also referred to as a base station)). Random access is a procedure for establishing a connection between a UE and a base station. During a random access procedure, a UE transmits a preamble via a RACH to a base station to initiate establishment of a connection. Upon receiving the preamble, the base station schedules uplink resources for the UE and assigns the resources in a random access response (RAR).

In some aspects of the present disclosure, a UE may estimate a propagation delay from the UE to a satellite and from the satellite to a ground base station. In other aspects, a RAR window timing is set based on a downlink (DL) propagation delay. One or more examples include address uplink (UL) grant handling in the RAR (e.g., message two (Msg2) of the random access procedure) where in one example, the RAR includes an uplink grant. In this example, message three (Msg3) of the random access procedure may be transmitted based on the uplink grant of the RAR.

Figure 5:
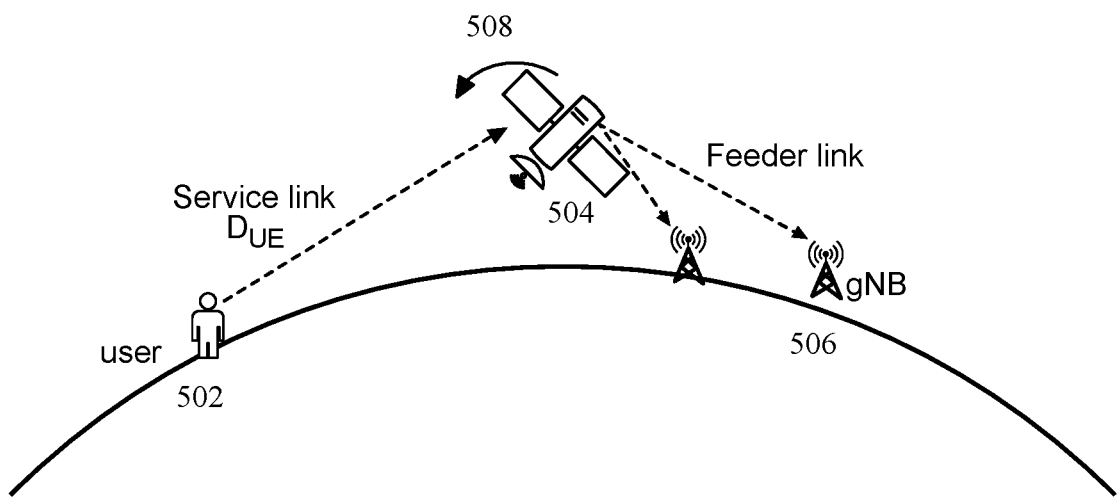
FIG. 5 illustrates an example of a non-terrestrial network including a propagation delay, in accordance with one or more aspects of the present disclosure

FIG. 5 illustrates an example of a non-terrestrial network including a propagation delay, in accordance with one or more aspects of the present disclosure. A total one way propagation delay is equal to a delay ($D_{UE}$) on a service link between a UE 502 and a satellite 504 plus a delay ($D_{sat}$) on a feeder link between the satellite 504 and a base station (e.g., gNB) 506. If the base station 506 resides at the satellite 504, the total one way propagation delay is equal to the delay between the UE 502 and the satellite 504 ($D_{UE}$). The UE 502 may estimate the delay $D_{UE}$ based on location information, for example, with global navigation satellite system (GNSS) capability, but may not be able to estimate the delay $D_{sat}$ due to the speed of the satellite or handover of a feeder link. In the example of FIG. 5, the satellite moves at a speed of 7.5 km/s along a trajectory 508, which can be predicted by the UE 502 based on ephemeris data. The UE 502 may estimate its position based on the ephemeris data. The delay for the feeder link may be $D_{sat}-\Delta_{sat}$, where $\Delta_{sat}$ is the change in satellite position. It is noted that when the network node is the satellite 504, for example, when no base station is involved, the propagation delay is only the delay between the satellite 504 and the UE 502.

Various options are available for the UE 502 to estimate the total one way propagation delay. In one option, the UE 502 may estimate the total one way propagation delay by using a time stamp provided in a synchronization signal block (SSB), physical broadcast channel (PBCH), and/or a system information broadcast (SIB) message. For example, the time stamp may be provided in a system information block one (SIB1) message and/or an NTN specific SIB message. The UE may estimate the propagation delay based on the time stamp and time of reception.

In another option, the UE 502 may estimate the total one way propagation delay by using universal time for subframe number (SFN) timing. For example, the UTC (coordinated universal time) starting at a specific time may be assigned to system frame number zero (SFN 0). The UE 502 can estimate the propagation delay based on the boundary of the SFN 0. An indication of whether the cell is using coordinated universal time for SFN timing may be provided in a SIB message. In some aspects, the indication may be provided if the base station 506 is not following the specific time reference.

Figure 6:
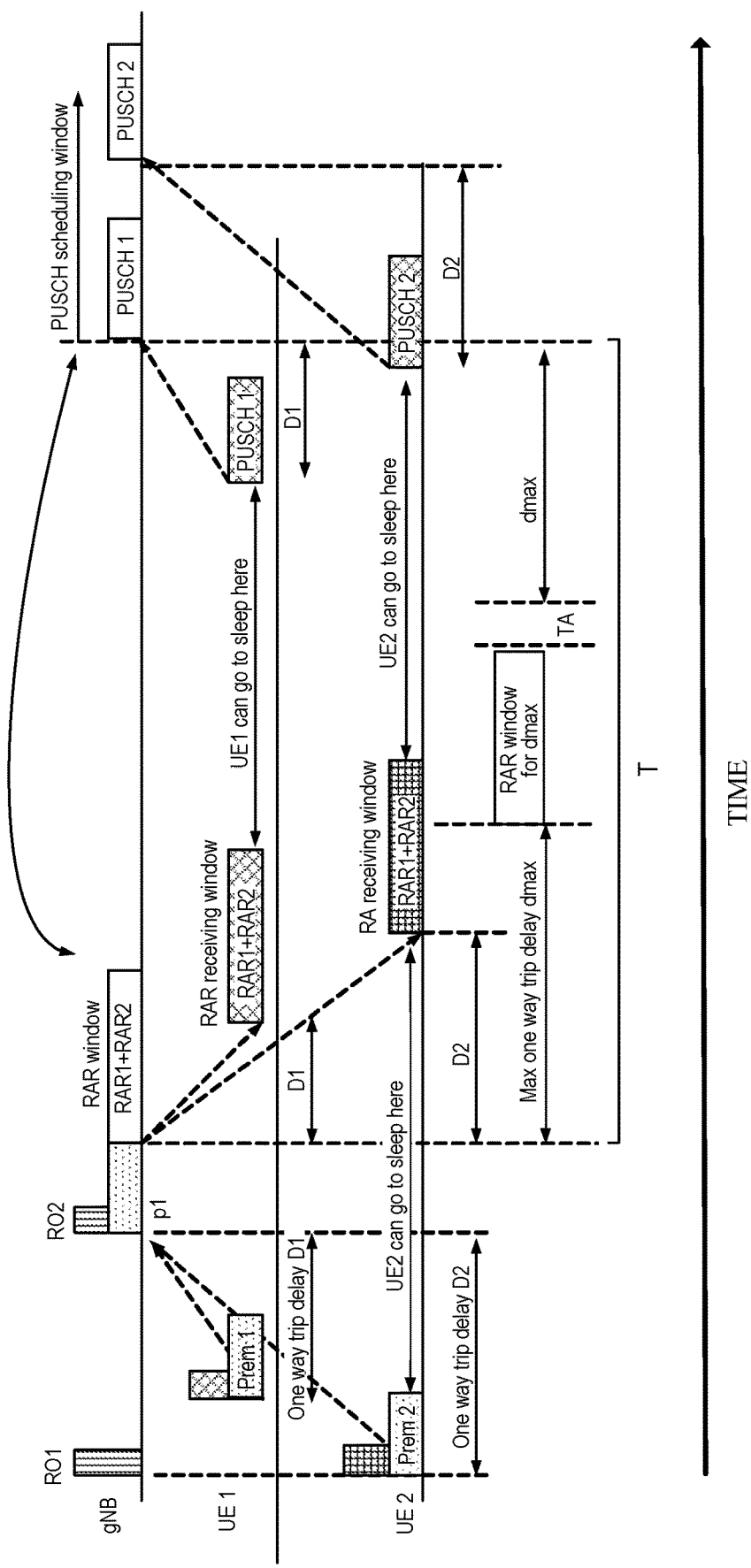
FIG. 6 is a timing diagram illustrating an exemplary random access procedure targeting a same random access channel (RACH) occasion, in accordance with one or more aspects of the present disclosure.

FIG. 6 is a timing diagram illustrating an exemplary random access procedure targeting a same random access channel (RACH) occasion, in accordance with one or more aspects of the present disclosure. FIG. 6 shows a RACH procedure for two UEs, UE 1 and UE 2, targeting a same RACH occasion/opportunity (RO) (e.g., RO2 in FIG. 6) at a network (e.g., base station (gNB) or gateway) considering each UE's GNSS capability. In the example of FIG. 6, it is assumed that the UEs and base station have a synchronized SFN boundary. Each RO may occur in a slot based on the gNB timeline or based on a satellite timeline (not shown).

To enable preamble transmission, according to one or more aspects of the present disclosure, each UE may estimate the base station's SFN based on satellite ephemeris data and each UE's respective location. Then, each UE may calculate the one way propagation delay time (D) between the UE and base station. Each UE may transmit the physical random access channel (PRACH) preamble "D" time units before the start of the RACH occasion at the gNB side. In other words, each UE may pre-compensate for the delay when sending its preamble. In one example, the UE's RACH occasion (RO) is D time units after the gNB's RO and the preamble is transmitted 2*D time units earlier than the UE's RO.

In FIG. 6, UE 1 transmits its preamble (Prem 1) a one way trip delay (D1) before the next RO, in this example RO2. Similarly, UE 2 transmits its preamble (Prem 2) a one way trip delay (D2) before the next RO, in this example also RO2. The base station (e.g., gNB) receives the preambles (Prem 1 and Prem 2) from UE 1 and UE 2 at RO2 and processes the preambles during a processing time p1. Each one way trip delay D1, D2 is also referred to as a UE specific timing advance.

After transmitting the preamble while in IDLE mode, each UE can go to sleep according to its paging cycle (e.g., gNB's paging occurrence (PO)) for a time period equal to twice the UE specific timing advance (e.g., 2*D), also known as the round trip delay. The round trip delay may be with respect to either the satellite or the base station. The sleep may begin as soon as the preamble is transmitted in a period referred to as a gap. In the example of FIG. 6, UE 2 enters a sleep mode after transmitting its preamble (Prem 2). If the UE is in RRC CONNECTED mode, the UE may follow the current discontinuous reception (DRX) state during this time period. In another option, regardless of the current DRX state, the UE may be considered to be NOT in Active Time during this period. The sleep period ends when starting the RAR window.

In one or more examples, after receiving the preambles, the base station may start a random access response (RAR) window, during which the base station may transmit RARs to each UE. According to one or more aspects of the present disclosure, each UE may start a random access response (RAR) receiving window at the first physical downlink control channel (PDCCH) occasion as specified in 3GPP TS 38.213 after twice the UE specific timing advance (e.g., 2*D) from the end of the random access preamble transmission. If the UE was sleeping, the RAR is received after waking up. Each UE receives all transmitted RARs, but only decodes its own RAR. As seen in FIG. 6, UE 1 receives its own RAR (RAR1) and the RAR (RAR2) intended for UE 2 during its RAR receiving window. UE 2 receives its own RAR (RAR2) and the RAR (RAR1) intended for UE 1 during its RAR receiving window.

Scheduling the physical uplink shared channel (PUSCH) is now discussed. In some aspects, the PUSCH scheduling window for the base station may start a period T after the start of the base station RAR window. In one example, the period T is the gap between the RAR window and the earliest PUSCH location for the base station.

According to one or more aspects of the present disclosure, the period T may be calculated as:

T=2*Dmax+RAR window+TA (timing advance), where Dmax is the maximum one way propagation delay time from any UE to the base station in a given cell. In other words, in one example, Dmax may correspond to the propagation delay for the farthest UE from the base station. Farthest refers to the UE that has the longest line of sight distance to the base station, or the UE with the longest propagation delay relative to the base station. The timing advance value, TA, may be assumed to be with respect to the downlink (DL) reference timing. The RAR window may be the duration of the window for receiving and processing an RAR.

According to one example, the earliest time when a UE can transmit Msg3 in a PUSCH may be D time units before the start of the PUSCH scheduling window. In the example of FIG. 6, UE 1 transmits D1 time units before the start of the PUSCH scheduling window and UE 2 transmits D2 time units before the start of the PUSCH scheduling window. As a result of delaying the PUSCH scheduling window based on Dmax, all UEs experience the same delay, regardless of how far the UE is from the base station. In other aspects of the present disclosure, the UE may be scheduled with random resources and the UE may select the best resources, as described in more detail below.

Figure 7:
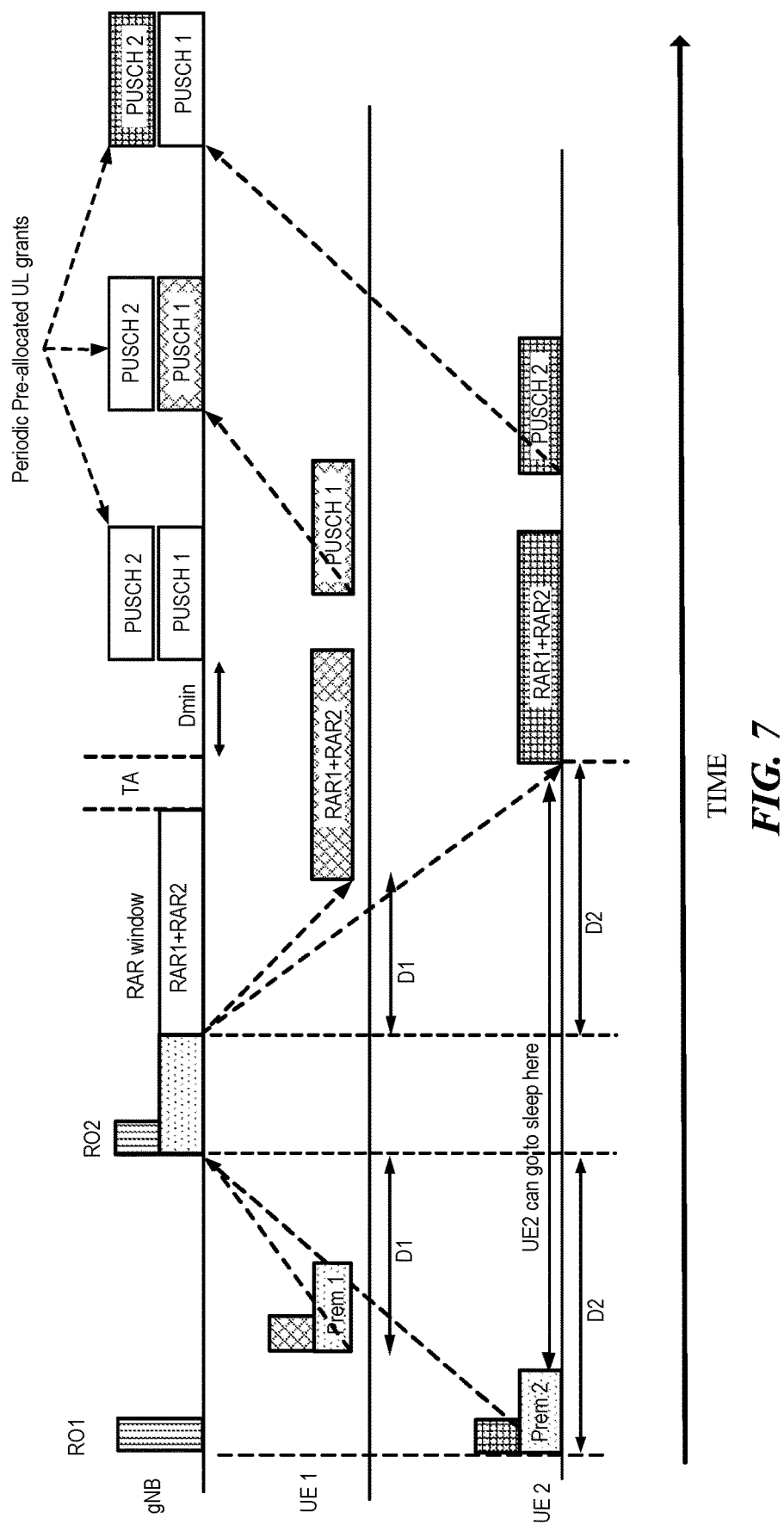
FIG. 7 is a timing diagram illustrating an exemplary random access procedure with periodic pre-allocated physical uplink shared channel (PUSCH) resources, in accordance with one or more aspects of the present disclosure.

An alternative solution for scheduling PUSCH is now described. FIG. 7 is a timing diagram illustrating an exemplary random access procedure with periodic pre-allocated physical uplink shared channel (PUSCH) resources, in accordance with one or more aspects of the present disclosure. In FIG. 7, the UEs (UE1 and UE2) transmit their preambles (Prem 1 and Prem 2) and receive the RARs (RAR1 and RAR2) with the same timing as described with respect to FIG. 6. According to one or more aspects of the present disclosure, periodic pre-allocated uplink (UL) (e.g., PUSCH) resources may be used to transmit Msg3. In one example, the periodic allocation may be in lieu of a resource indicated in the RAR message (Msg2). The starting point of the pre-allocated periodic PUSCH resources may be the time (Dmin+TA) from the end of the RAR message or a RAR window, delayed by the minimum propagation delay (Dmin). The parameter Dmin may be the minimum one way propagation delay time from the UE to the base station in the given cell, in other words, the propagation delay from the closest UE to the base station. In this aspect of the present disclosure, the UE may select the first available resource. Closest refers to the UE that has the shortest line of sight distance to the base station, or the UE with the shortest propagation delay relative to the base station.

FIG. 7 illustrates three sets of periodic pre-allocated uplink (UL) grants. In the example of FIG. 7, UE 1 transmits its PUSCH (PUSCH 1) based on the second of the three pre-allocated uplink resources because its delay D1 is relatively short. UE 2 transmits its PUSCH (PUSCH 2) based on the third of the three pre-allocated uplink grants because its delay D2 is longer than the delay D1 for UE 1.

In one option, a RAR may indicate the activation of a pre-allocated PUSCH resource. The configuration (e.g., periodicity, UL grant information) may be provided in a common configuration by a SIB message and/or dedicated radio resource control (RRC) signaling. In another option, the pre-allocated PUSCH resources may be pre-configured as a common configuration. A common configuration is a configuration that may be shared among multiple UEs and commonly used by multiple UEs.

In other aspects of the present disclosure, multiple uplink grants may be provided in the RAR (Msg2). Alternatively, an uplink grant in the RAR may be mapped to multiple uplink grants at different resources (e.g., time and frequency resources). These solutions account for a number, X, of one way propagation delay times (D1, D2, . . . DX) where DX=Dmax/X. The start of the PUSCH scheduling window may be calculated based on DX. In these aspects, a UE with a one way propagation delay D, such that D2<D<=D1, may use the uplink grant corresponding to D1. These solutions are more dynamic than the previously described solutions.

In still other aspects, a UE may indicate an amount of its delay in its preamble. That is, the preamble may inform the network about the UE specific delay. In accordance with these aspects, the PUSCH may be scheduled according to a delay group. For example, UEs may be grouped according to their respective delays. For example, the preambles may be partitioned into X groups to consider X one way propagation delay times (D1, D2, . . . DX) where DX=Dmax/X. The start of the PUSCH scheduling window may be calculated based on a group ID corresponding to the preamble the base station receives. In other words, the preamble may inform the network about the delay. The network may schedule the PUSCH according to the delay group. In these aspects, a UE with a one way propagation delay D, such that D2<D<=D1, may use the preamble group corresponding to D1. These solutions are also more dynamic than some of the previously described solutions.

Figure 8:
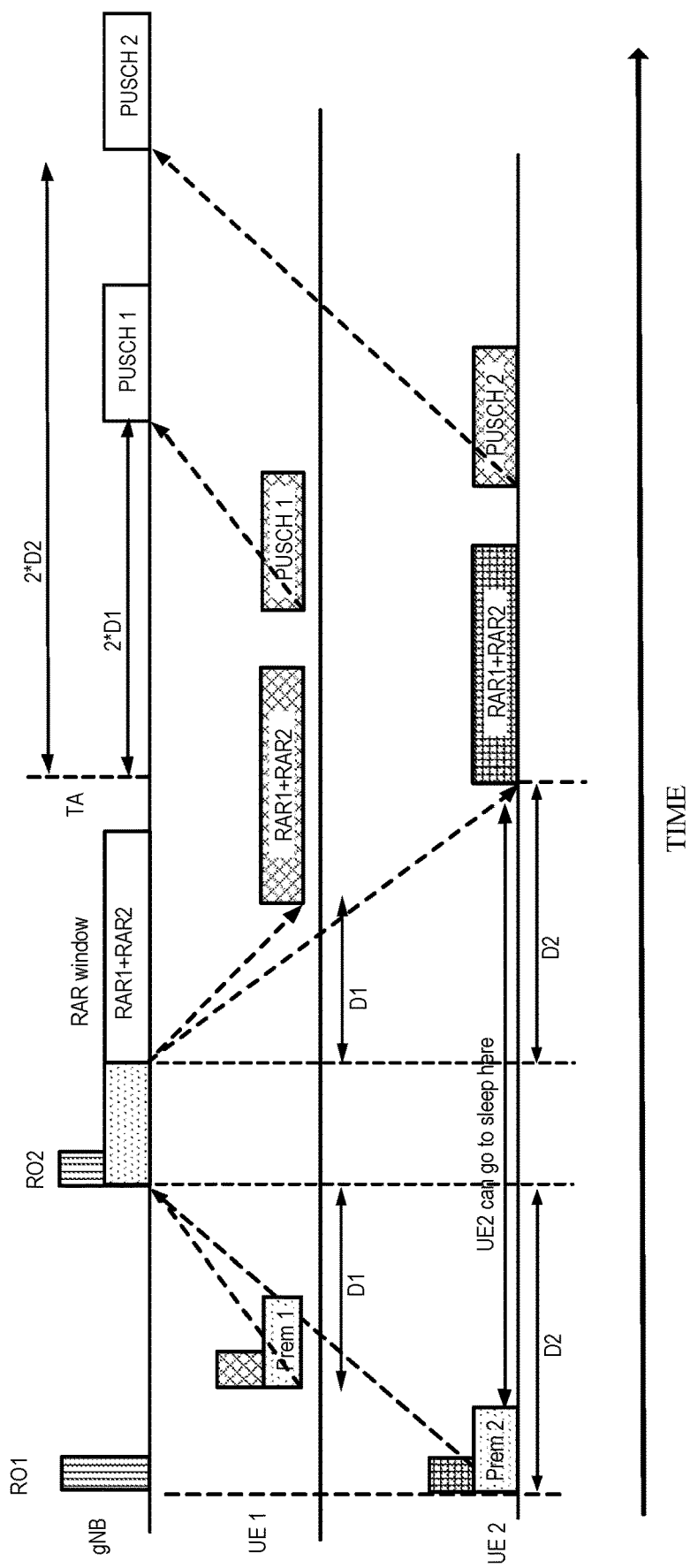
FIG. 8 is a timing diagram illustrating an exemplary random access procedure with physical uplink shared channel (PUSCH) resources based on propagation delay times, in accordance with one or more aspects of the present disclosure.

FIG. 8 is a timing diagram illustrating an exemplary random access procedure with physical uplink shared channel (PUSCH) resources based on propagation delay times, in accordance with one or more aspects of the present disclosure. In FIG. 8, the UEs (UE1 and UE2) transmit their preambles (Prem 1 and Prem 2) and receive the RARs (RAR1 and RAR2) with the same timing as described with respect to FIG. 6. In FIG. 8, the preamble from UE 1 (Prem 1) corresponds to delay D1 and the preamble for UE 2 (Prem 2) corresponds to delay D2. Thus, UE 1 transmits its PUSCH (PUSCH 1) to arrive with a first delay group at 2*D1, and UE 2 transmits its PUSCH (PUSCH 2) to arrive with a second delay group at 2*D2.

According to one or more examples of the present disclosure, all UEs may have the same timing advance, instead of UE specific timing advances. For example, the delay Dmax may be assigned to each UE. In these aspects, the base station may not receive the preambles from all of the UEs at the same time. Each UE may transmit at its own RACH opportunity (RO). Thus, the base station may set a preamble receiving window to receive the preambles from all possible UEs. This option may be used for UEs with or without GNSS capability.

Figure 9:
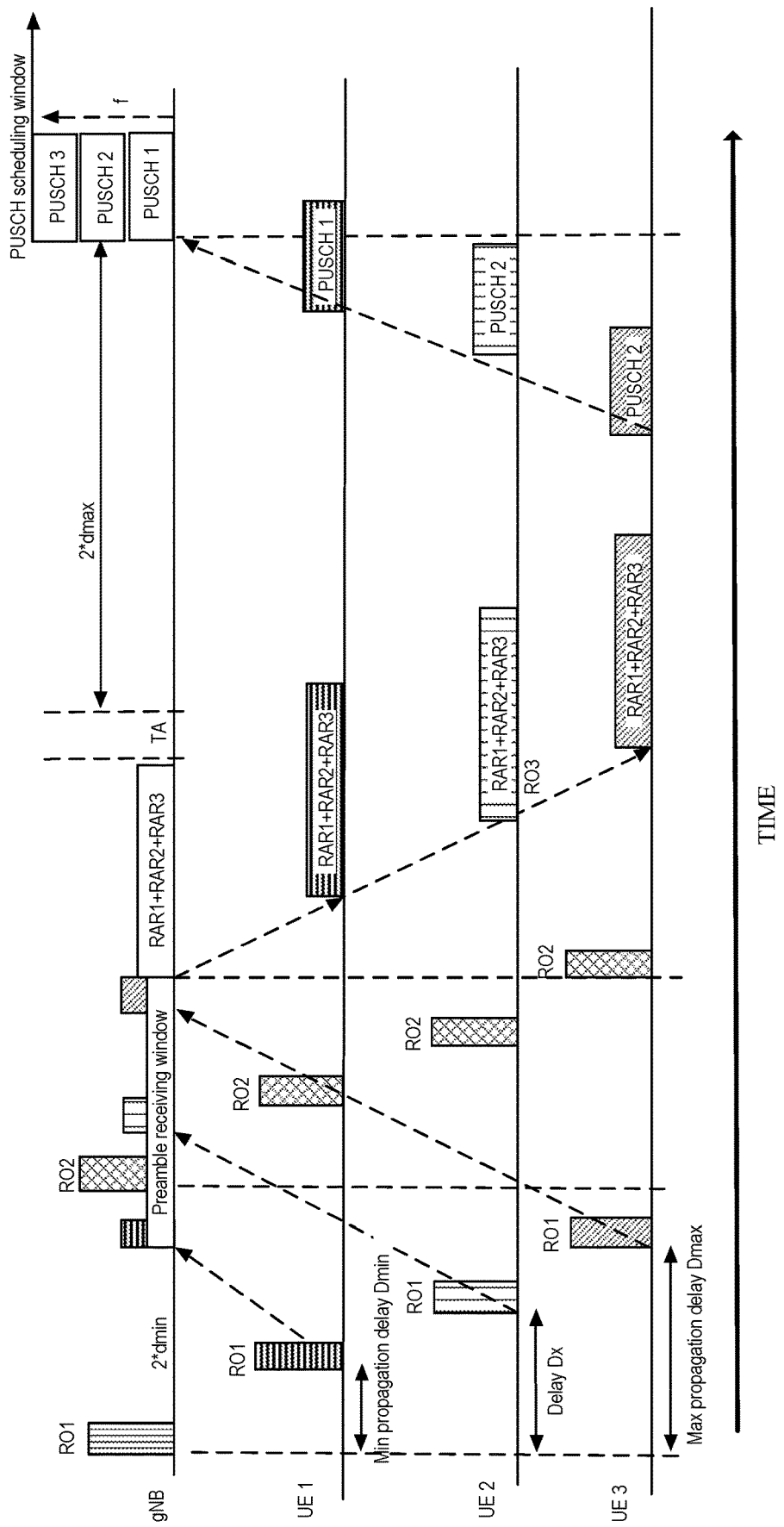
FIG. 9 is a timing diagram illustrating an exemplary random access procedure with user equipment (UE) specific random access channel (RACH) occasions and a common physical uplink shared channel (PUSCH) scheduling window, in accordance with one or more aspects of the present disclosure.

FIG. 9 is a timing diagram illustrating an exemplary random access procedure with UE specific random access channel (RACH) occasions and a common physical uplink shared channel (PUSCH) scheduling window, in accordance with one or more aspects of the present disclosure. In FIG. 9, a common timing advance is assigned to each UE. In the example of FIG. 9, each UE may estimate the base station SFN based on satellite ephemeris data and the UE location. The UE then calculates the one way propagation delay (D) between the UE and base station. The UE determines its RACH occasion in its SFN timing and transmits the preamble according to the calculated RO in its timing.

In FIG. 9, UE 1 is the closest to the base station and thus has the smallest propagation delay (Dmin). UE 1 determines its RO based on Dmin. That is, the RO for UE 1 occurs at time Dmin, after the RO for the base station. FIG. 9 shows the first RO (RO1) for the base station, and the first RO (RO1) for UE 1 occurring at time Dmin after the RO1 of the base station. Similarly, UE 2 determines its RO based on the propagation delay, Dx, between UE 2 and the base station. The RO for UE 2 occurs at time, Dx, after the RO for the base station. FIG. 9 shows the first RO (RO1) for the base station and the first RO (RO1) for UE 2 occurring at time Dx after the RO1 of the base station. UE 3 is the farthest from the base station and thus has the largest propagation delay (Dmax). Similar to UE 1 and UE 2, UE 3 determines its RO based on the propagation delay, Dmax, between UE 3 and the base station. That is, the RO for UE 3 occurs at time Dmax, after the RO for the base station. FIG. 9 shows the first RO (RO1) for the base station and the first RO (RO1) for UE 3 occurring at time Dmax after the RO1 of the base station.

An overall view of RACH procedures for UE 1 and UE 2 using their own adjusted RACH occasion (RO1), considering the UEs' GNSS capability, is shown in FIG. 9. The base station may not receive all preambles at one time because the UEs send the preambles at their own RACH occasions. In this example, the preamble receiving window for the base station timeline starts at 2*Dmin after the RACH occasion RO1 in the base station timeline. The preamble receiving window's duration may be twice the difference between Dmax and Dmin, which is 2*(Dmax-Dmin). As a result of the preamble receiving window, the base station can receive the preambles from UE 1, UE 2, and UE 3.

In some aspects of the present disclosure, the base station may verify in the PRACH configuration that the preamble receiving windows for different RACH occasions do not overlap. For example, the gap between RO1 and RO2 should be larger than the preamble receiving window. Otherwise, any individual UE (UEx) may not use RO2 if the gap between RO1 and RO2 is less than 2*(Dmax-Dx), where Dx is the propagation delay for the UEx. In the example shown in FIG. 9, UE 1 cannot use RO2 because it is too close to UE 1's RO1, but UE 3 can use its RO2.

In one example, after transmitting the RACH preamble while the UE is in IDLE mode, the UE may enter sleep mode according to its paging cycle (e.g., gNB's paging occasion (PO)) for a 2*Dmax time period. Each UE may wake up and start its random access response (RAR) window at the first PDCCH occasion, as specified in 3GPP TS 38.213 [6], after a 2*Dmax delay from the end of the random access preamble transmission. During the RAR window, each UE may receive the RAR for UE 1 (RAR 1), the RAR for UE 2 (RAR 2), and the RAR for UE 3 (RAR 3). Each UE, however, may only decodes its own RAR.

According to one or more aspects of the present disclosure related to scheduling PUSCH, all PUSCH messages are received simultaneously in this example. As seen in FIG. 9, the PUSCH from UE 1 (PUSCH 1), the PUSCH from UE 2 (PUSCH 2), and the PUSCH from UE 3 (PUSCH 3) all arrive at the start of the PUSCH scheduling window in the base station timeline.

In a first option shown in FIG. 9, the UE applies the timing advance and transmits in the PUSCH location indicated in the RAR. The base station schedules the PUSCH reception at least (TA+2*Dmax) after the end of the RAR in the base station timeline. In some configurations, a configured UE time offset is used instead of the RAR window for calculating when to schedule the PUSCH reception. The configured UE time offset may be smaller than the RAR window. The UE with the largest one way propagation delay may be able to send the PUSCH immediately after applying the timing advance. In this option, the UE with the smallest one way propagation delay may experience differential delay of at least (Dmax−Dmin).

Figure 10:
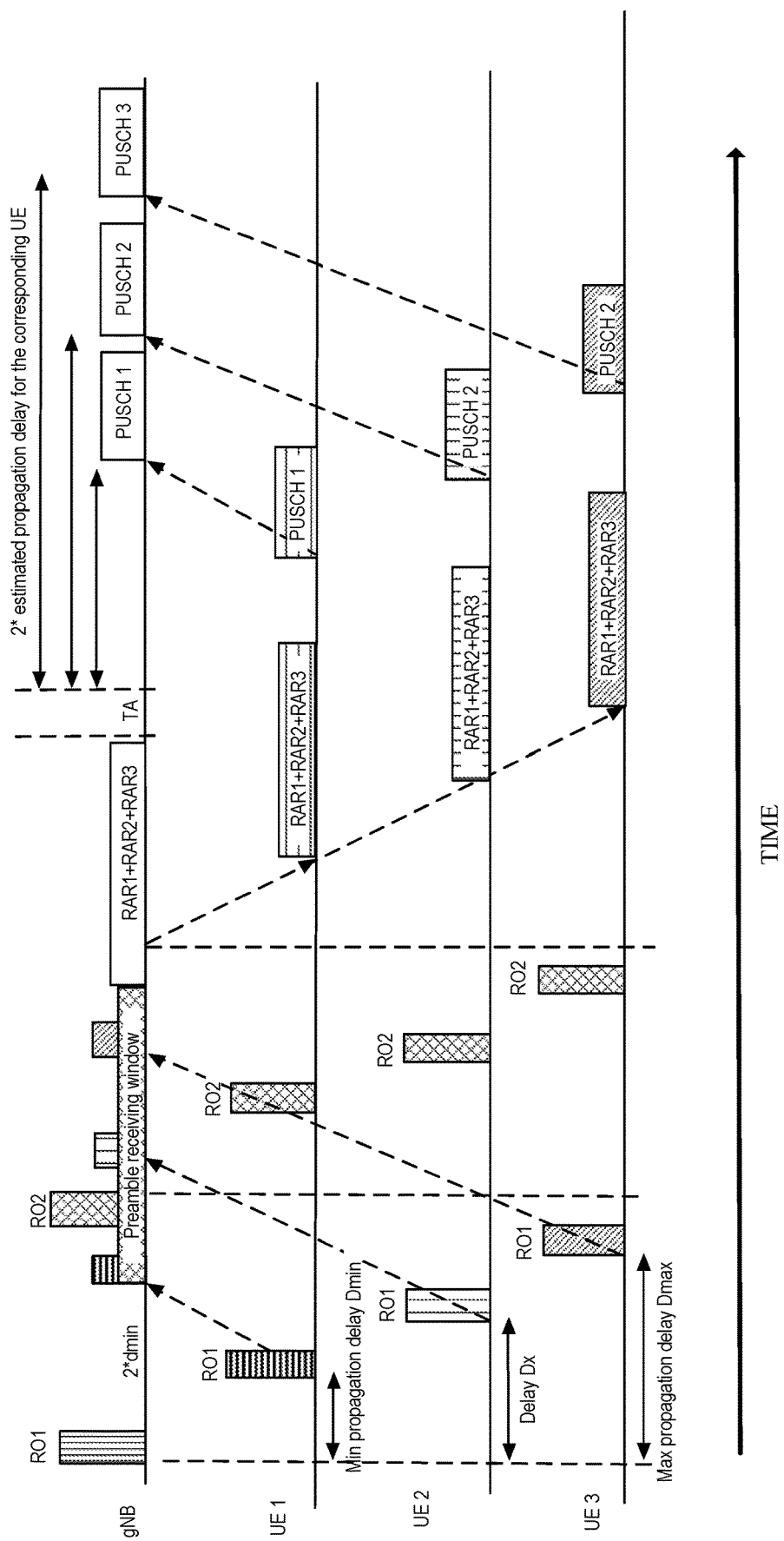
FIG. 10 is a timing diagram illustrating an exemplary random access procedure with UE specific random access channel (RACH) occasions and UE specific physical uplink shared channel (PUSCH) resources, in accordance with one or more aspects of the present disclosure.

According to one or more examples related to scheduling PUSCH, the PUSCH messages arrive at different times for each UE. The arrival time of the preambles in the scheduling window control scheduling of the PUSCH. FIG. 10 is a timing diagram illustrating an exemplary random access procedure with UE specific random access channel (RACH) occasions and UE specific physical uplink shared channel (PUSCH) resources, in accordance with one or more aspects of the present disclosure. In the example of FIG. 10, the preamble and RAR timing is the same as described with respect to FIG. 9. The PUSCH timing is different. In the example shown in FIG. 10, the gNB estimates the one way propagation delay D from the time of arrival of the random access preamble in the preamble receiving window. For example, if the preamble arrives at the beginning of the preamble window, then the one way propagation delay is estimated to be the shortest one way propagation delay Dmin. The base station schedules the resources for the PUSCH based on the propagation delay for each UE. For example, the gNB schedules the PUSCH at least (TA+ 2*estimated one way propagation delay) after the end of the RAR in the gNB time line, as shown in FIG. 10. Thus, because UE 1 is estimated to have the shortest one way propagation delay, the PUSCH for UE 1 is scheduled first. Because UE 3 is estimated to have the longest one way propagation delay, the PUSCH for UE 3 is scheduled last. In this example, a single uplink grant may have variable timing to account for the different propagation delays.

According to one or more examples of the present disclosure, the base station may not wait until the end of the preamble receiving window to send the RARs. Rather, the base station may send a separate RAR in response to each preamble. Thus, each UE has its own timeline. This option may be used for UEs with or without GNSS capability.

Figure 11:
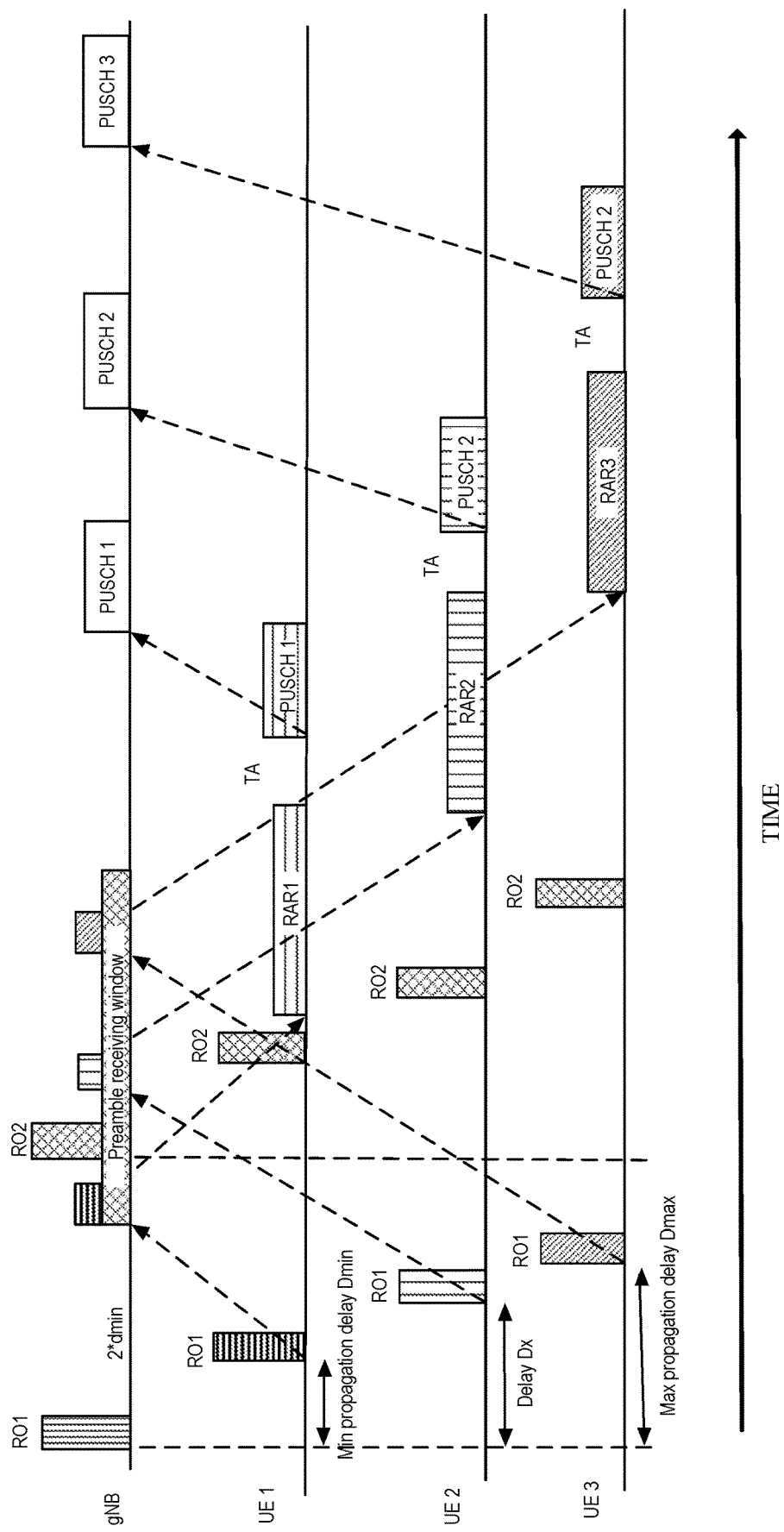
FIG. 11 is a timing diagram illustrating an exemplary random access procedure with UE specific random access channel (RACH) occasions and random access response (RAR) windows based on the UE specific RACH occasions, in accordance with one or more aspects of the present disclosure.

FIG. 11 is a timing diagram illustrating an exemplary random access procedure with UE specific random access channel (RACH) occasions and random access response (RAR) windows based on the UE specific RACH occasions, in accordance with one or more aspects of the present disclosure. In FIG. 11, each UE uses its own RACH occasion (RO1) and starts the RAR window after their own one way propagation delay time (Dx). In this option, similar to the option described with respect to FIGS. 9 and 10, the preamble receiving window for the gNB starts 2*Dmin after the RACH occasion, the duration of the preamble window=2*(Dmax−Dmin). Moreover, the gNB verifies in the PRACH configuration that the preamble receiving windows for the different RACH occasions do not overlap.

In the example of FIG. 11, the gNB does not wait until the end of the preamble receiving window to send the RAR (Msg2). The gNB responds separately to each preamble. For example, UE 1, UE 2, and UE 3 each receive their own RAR at different times. That is, UE 1 receives RAR 1 at a first time, UE 2 receives RAR 2 at a second time, and UE 3 receives RAR 3 at a third time. The gNB transmits each RAR upon receiving and processing each preamble.

According to this aspect of the present disclosure, the UE may estimate the gNB SFN based on satellite ephemeris data and UE location. The UE may then calculate the one way trip time (D) between the UE and gNB. The UE may determine its RACH occasion (RO) in its SFN timing. The UE may transmit the preamble in the RO in its timing. After transmitting the preamble in IDLE mode, the UE may go to sleep according to its paging cycle (e.g., gNB's PO) for 2*D time period. The UE awakens and starts the random access response (RAR) window at the first PDCCH occasion as specified in 3GPP TS 38.213 [6] after 2*D delay from the end of the random access preamble transmission. In this example, the gNB may transmit an RAR corresponding to each received PRACH preamble before the preamble receiving window expires. The UE may receive an unintended RAR (e.g., a preamble identifier in the RAR does not belong to UE). In this case, the UE keeps monitoring the PDCCH for its RAR until the RAR window expires. The unintended RAR may be received in each of the previously described options, with the same solution also applicable there.

In order to schedule the PUSCH, the existing procedure may be applied for the UE to send Msg3 in the PUSCH. However, the gNB may schedule the PUSCH at least (TA+2*estimated one way trip time) after the end of the RAR in the gNB timeline.

Figure 12:
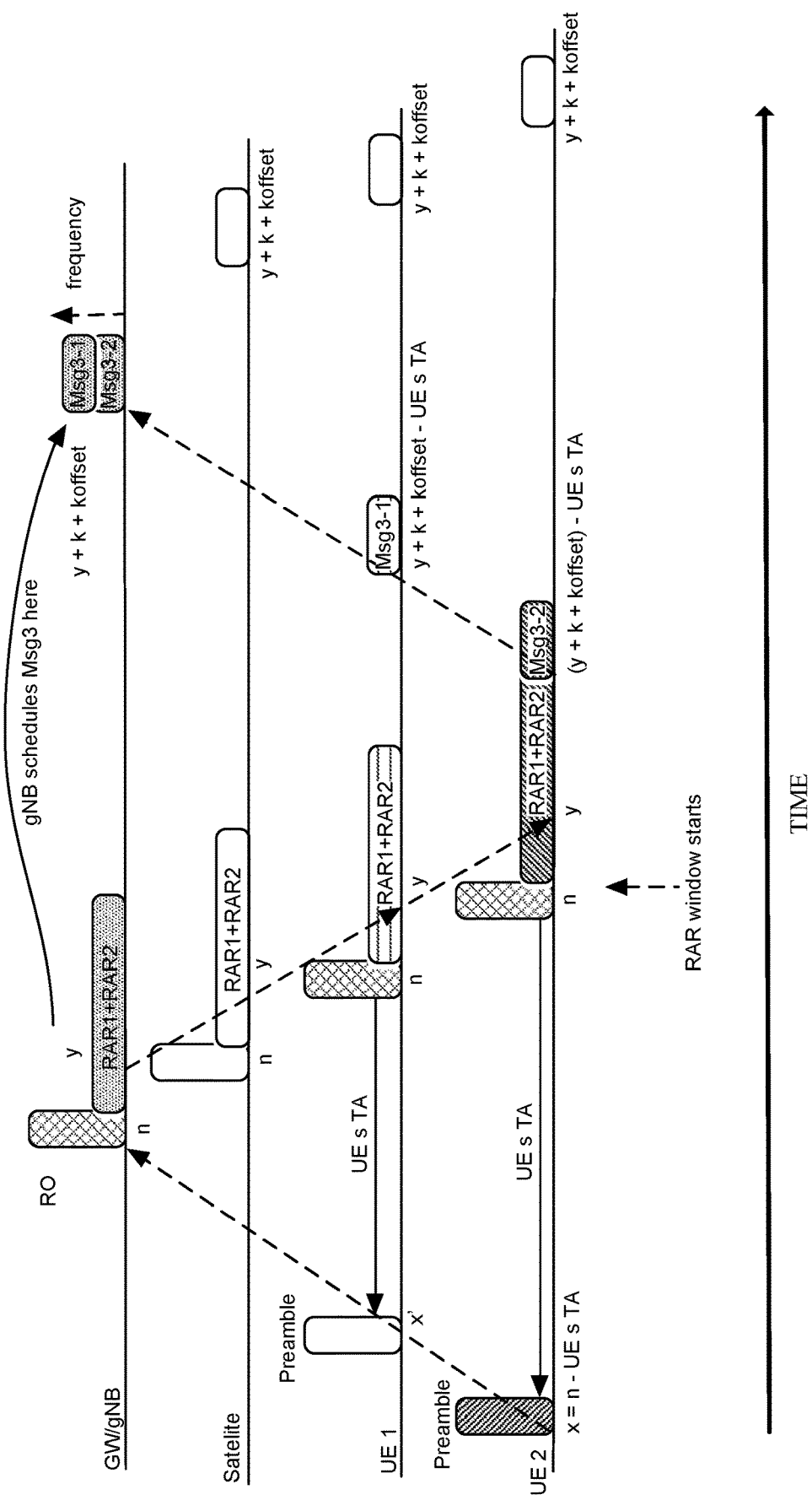
FIG. 12 is a timing diagram illustrating an exemplary random access procedure targeting a same random access channel (RACH) occasion and a common physical uplink shared channel (PUSCH) scheduling window, in accordance with one or more aspects of the present disclosure.

FIG. 12 is a timing diagram illustrating an exemplary random access procedure targeting a same random access channel (RACH) occasion and a common physical uplink shared channel (PUSCH) scheduling window, in accordance with one or more aspects of the present disclosure. The example shown in FIG. 12 is a combination of the options described with respect to FIGS. 6-9. In FIG. 12, a satellite operates as a relay between the base station (e.g., gateway (GW) or gNB) and each UE. The propagation delay includes the time the delay between the satellite and the UE, and also the delay between the satellite and the base station. In FIG. 12, UE 1 and UE 2 transmit their preamble based on a UE specific timing advance. UE 1 transmits at slot x' and UE 2 transmits at slot x, which corresponds to the slot n of the RO at the base station, minus the UE specific timing advance. The base station (e.g., gateway (GW)/gNB) receives both preambles at the same time during the RO at slot n in the base station timeline. The base station transmits RAR 1 and RAR 2 at timeslot y after receiving the preambles. UE 1 and UE 2 transmit Msg3 (e.g., the PUSCH) at timeslot y+k+koffset−the UE specific timing advance, where k is the processing delay and koffset is a scheduling offset greater than the UE specific timing offset minus k. The base station schedules reception of Msg3 (e.g., PUSCH) at the subframe y+k+koffset. Thus, Msg3-1 from UE 2 and Msg3-1 from UE 1 arrive at the base station at the same time. The messages may be frequency division multiplexed to allow decoding by the base station of both messages received at the same time.

One or more aspects of the present disclosure are applicable to UEs with GNSS capabilities. The RACH procedures previously described with respect to FIGS. 9-12 may also be used for those UEs that have no GNSS capability to calculate the trip time and gNB timeline. In these cases, the UEs may start monitoring earlier and for a longer time period in order to obtain a timing reference based on the reception time of SSB; or receive time information (e.g., a time stamp) in an SSB such that the UE can calculate the DL propagation delay.

For preamble transmission, the UE determines its RACH occasion (e.g., transmission time instant for the preamble based on received timing of a downlink message, such as an SSB) based on the received timing of the downlink message such that the gNB receives the preamble within its reception window. For example, for an SSB, a time stamp in the SSB or SIB indicates the received timing of the downlink message. The information is updated for each cell.

As described above, in some cases, after transmitting the preamble, all UEs may start the RAR window after 2*Dmax. In other cases, after transmitting the preamble, all UEs may start the RAR window after 2*Dmin. In these cases, the RAR window is also extended, for example, by the duration of the preamble receiving window.

In one or more examples for scheduling the PUSCH, the UE may apply the timing advance (TA) and transmit in the PUSCH location indicated in the RAR (Msg2). The gNB may schedule the PUSCH at least (TA+2*Dmax) after the end of the RAR in the gNB timeline. The UE with the largest one way trip delay may send the PUSCH after applying the TA. In this example, the UE with the smallest one way propagation delay suffers a differential delay of at least (Dmax−Dmin).

If the network can estimate the propagation delay D from the time of arrival of the preamble, the gNB may schedule the PUSCH at least (TA+2*D) after the end of the RAR in the gNB timeline. The UE may also estimate the propagation delay D by calculating a gap between the time of sending the preamble and the time of receiving the RAR. The estimate is possible if the gNB always sends the RAR immediately (or with a fixed processing time) upon receiving the preamble or if the RAR includes additional information on the gap between preamble reception and transmission of the RAR at the gNB.

Figure 13:
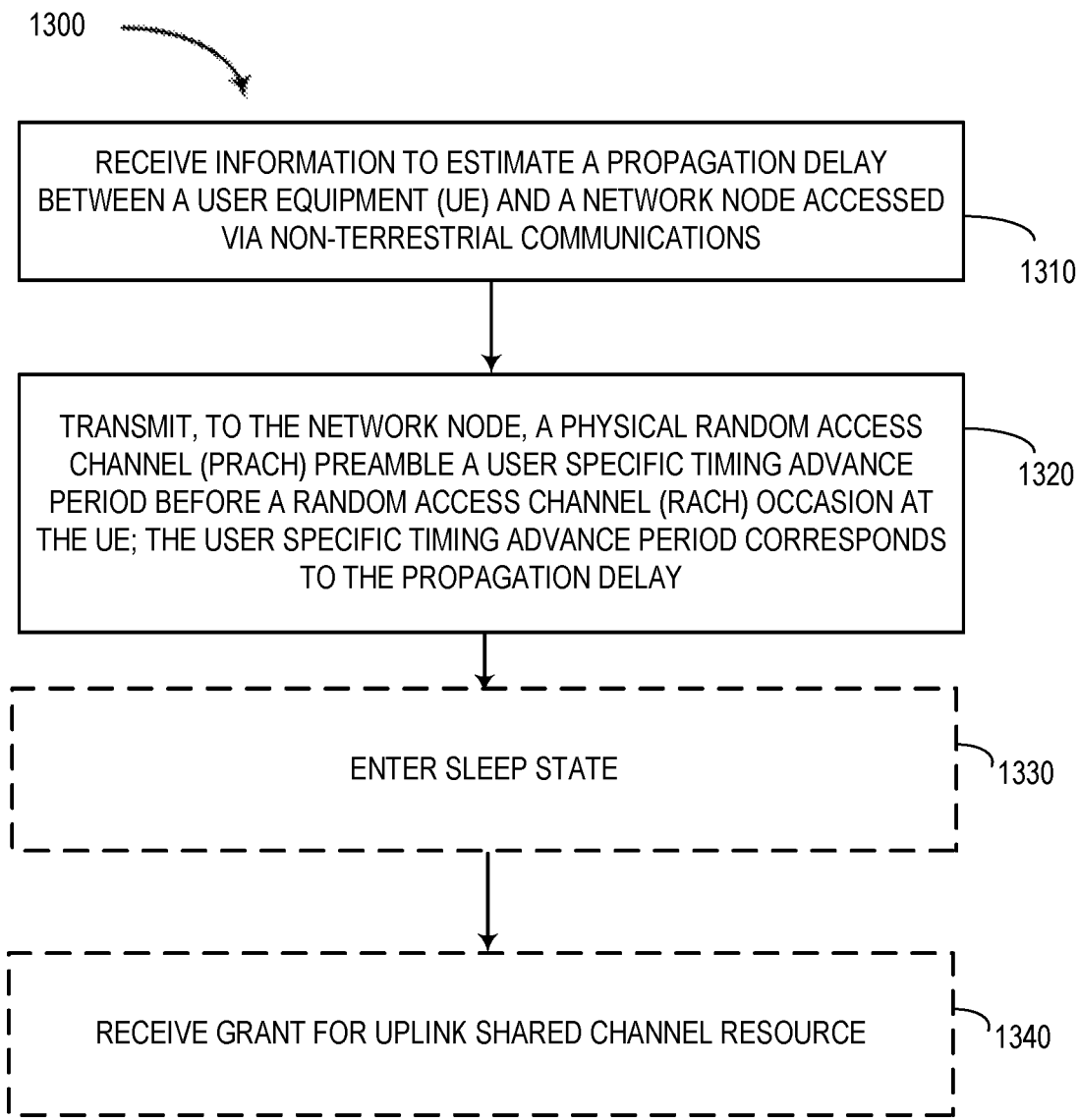
FIG. 13 is a flow diagram illustrating an example process performed, for example, by a user equipment, in accordance with various aspects of the present disclosure.

FIG. 13 shows a flowchart illustrating a method 1300 that supports random access procedures for non-terrestrial networks, in accordance with one or more aspects of the present disclosure. The operations of method 1300 may be implemented by a UE 115.

As shown in FIG. 13, in some aspects, the method 1300 may include receiving information to estimate a propagation delay between the UE and a network node accessed via non-terrestrial communications (block 1310). For example, the UE (e.g., using the antenna 252, demodulator (DEMOD) 254, multiple-input and multiple-output (MIMO) detector 256, receive processor 258, controller/processor 280, memory 282, and/or the like) may receive the information to estimate the propagation delay.

As shown in FIG. 13, in some aspects, the method 1300 may also include transmitting, to the network node, a physical random access channel (PRACH) preamble a user specific timing advance period before a random access channel (RACH) occasion at the UE, the user specific timing advance period corresponding to the propagation delay (block 1320). For example, the UE (e.g., using the antenna 252, modulator (MOD) 254, TX MIMO processor 266, transmit processor 264, controller/processor 280, memory 282, and/or the like) may transmit the PRACH preamble before the RACH occasion.

Optionally, the UE may enter a sleep state (block 1330). For example, the UE (e.g., using the controller/processor 280, memory 282, and/or the like) may enter a sleep state. Further optionally, the UE may receive a grant for an uplink shared channel resource (block 1340). For example, the UE (e.g., using the antenna 252, demodulator (DEMOD) 254, multiple-input and multiple-output (MIMO) detector 256, receive processor 258, controller/processor 280, memory 282, and/or the like) may receive the grant.

Figure 14:
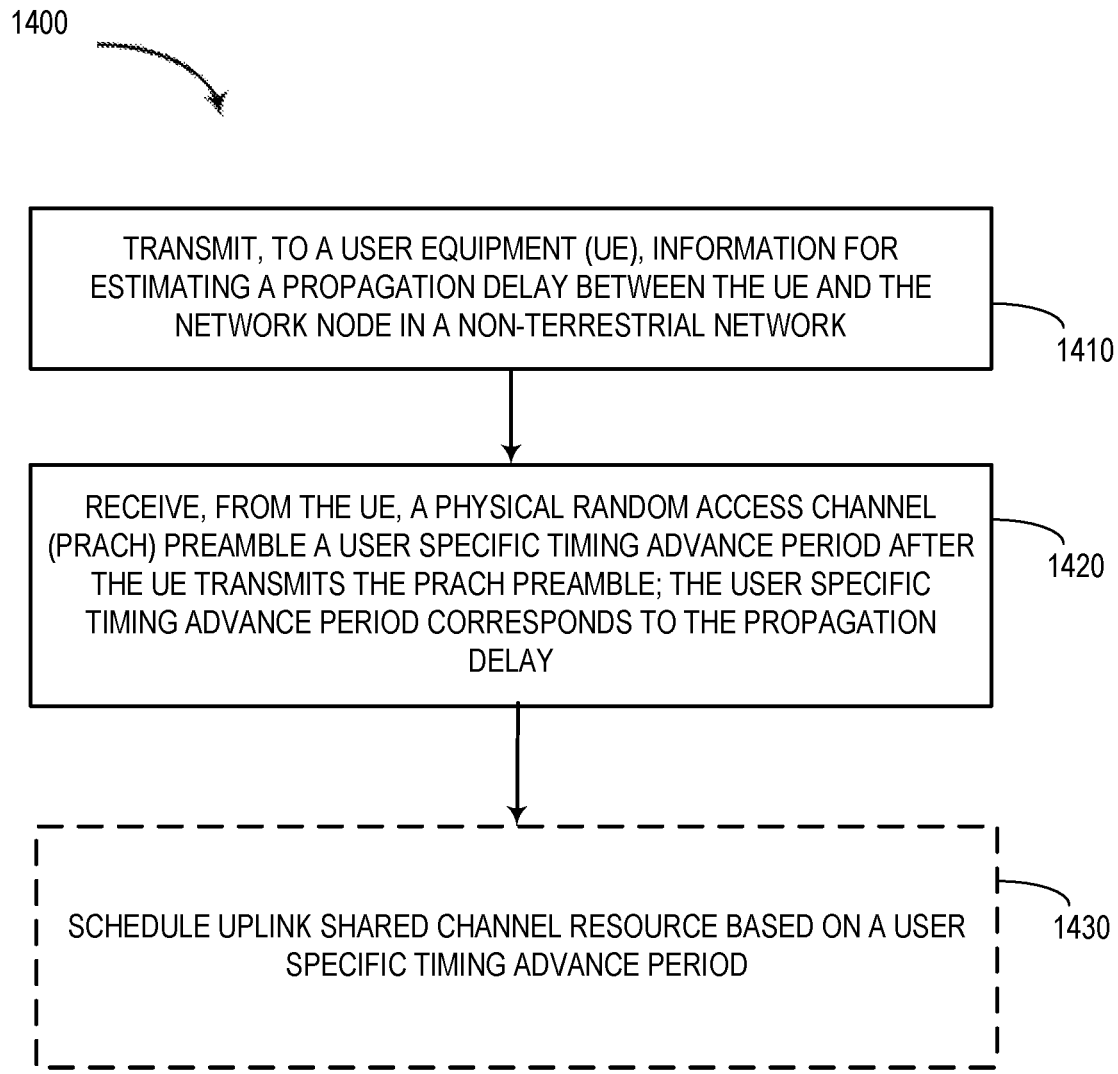
FIG. 14 is a flow diagram illustrating an example process performed, for example, by a network device, in accordance with various aspects of the present disclosure.

FIG. 14 is a diagram illustrating an example method 1400 performed, for example, by a network node (e.g., base station 105), in accordance with various aspects of the present disclosure.

As shown in FIG. 14, in some aspects, the method 1400 may include transmitting, to a user equipment (UE), information for estimating a propagation delay between the UE and the network node in a non-terrestrial network (block 1410). For example, the network node (e.g., using the antenna 234, MOD 232, TX MIMO processor 230, transmit processor 220, controller/processor 240, memory 242, and/or the like) may transmit information for estimating the propagation delay.

As shown in FIG. 14, in some aspects, the method 1400 may also include, receiving, from the UE, a physical random access channel (PRACH) preamble a user specific timing advance period after the UE transmits the PRACH preamble, the user specific timing advance period corresponding to the propagation delay (block 1420). For example, the network node (e.g., using the antenna 234, DEMOD 232, MIMO detector 236, receive processor 238, controller/processor 240, memory 242, and/or the like) may receive the PRACH preamble.

Optionally, the network node may schedule an uplink shared channel resource based on a user specific timing advance period (block 1430). For example, the network node (e.g., using the antenna 234, MOD 232, TX MIMO processor 230, transmit processor 220, controller/processor 240, memory 242, and/or the like) may schedule the uplink shared channel resource after the user specific timing advance, e.g., periodically or based on a maximum propagation delay.

Example 1

A method of wireless communication by a user equipment (UE), comprising: receiving information to estimate a propagation delay between the UE and a network node accessed via non-terrestrial communications; and transmitting, to the network node, a physical random access channel (PRACH) preamble a user specific timing advance period before a random access channel (RACH) occasion at the UE, the user specific timing advance period corresponding to the propagation delay.

Example 2

The method of example 1, wherein the receiving information to estimate comprises receiving information to estimate the propagation delay based at least in part on timing information included in system information.

Example 3

The method of any of the preceding examples, wherein the receiving information to estimate comprises receiving information to estimate the propagation delay based on a time stamp of a message received from the network node and a time of reception of the message, the time of reception based on a reference time acquired from a non-terrestrial network.

Example 4

The method of any of the preceding examples, wherein the receiving information to estimate comprises receiving information to estimate the propagation delay based at least in part on satellite ephemeris data and a location of the UE.

Example 5

The method of any of the preceding examples, further comprising starting a random access response (RAR) window at a first physical downlink control channel (PDCCH) occasion after a multiple of a duration of the propagation delay from transmitting the PRACH preamble.

Example 6

The method of example 5, wherein the multiple of the duration of the propagation delay between the UE and a network node is twice the duration of the propagation delay between the UE and a network node.

Example 7

The method of any of the preceding examples, wherein the propagation delay comprises a first delay between the UE and a satellite and a second delay between the satellite and the network node.

Example 8

The method of any of the preceding examples, further comprising entering a sleep state after transmitting the PRACH preamble, the sleep state lasting for a multiple of a duration of the propagation delay until starting a random access response (RAR) window.

Example 9

The method of any of examples 1-7, further comprising entering a sleep state after receiving a random access response (RAR) message from the network node until transmitting an uplink message.

Example 10

The method of any of the preceding examples, wherein the network node comprises one of a satellite or a base station communicating with the UE via the satellite.

Example 11

The method of any of the preceding examples, further comprising receiving a grant for an uplink shared channel resource after the user specific timing advance period indicated in a random access response (RAR) message, the uplink shared channel scheduled later than a start of a RAR window delayed by twice a maximum propagation delay in addition to one of a time of the RAR window or a configured UE time offset, the maximum propagation delay corresponding to a longest propagation delay for a UE farthest from the network node.

Example 12

The method of any of examples 10, further comprising receiving a grant for an uplink shared channel resource occurring periodically after the user specific timing advance period, the grant indicated in a random access response (RAR) message.

Example 13

The method of example 12, in which the uplink shared channel resource is a resource scheduled periodically after an end of the RAR message or a random access response (RAR) window delayed by a minimum propagation delay, the minimum propagation delay corresponding to a smallest propagation delay for a closest UE to the network node.

Example 14

The method of example 12 or 13, wherein the RAR message comprises a plurality of uplink grants.

Example 15

The method of example 14, wherein the plurality of uplink grants are based at least in part on the propagation delay.

Example 16

The method of any of examples 1-11, further comprising receiving, from the network node, a grant for an uplink shared channel resource via radio resource control (RRC) signaling or via a system information block (SIB), or as a common configuration.

Example 17

The method of any of the preceding examples, further comprising: receiving an indication of a grouping for the UE based at least in part on the propagation delay; transmitting the PRACH preamble based on the grouping; and receiving an uplink shared channel resource in a random access response (RAR) message based on the grouping.

Example 18

The method of any of the preceding examples, wherein transmitting the PRACH preamble occurs at a UE specific RACH occasion.

Example 19

The method of example 18, further comprising starting a random access response (RAR) window a time period after transmitting the PRACH preamble, the time period for delaying the RAR window comprising twice a selected propagation delay in addition to a duration of a preamble receiving window, the selected propagation delay corresponding to a shortest propagation delay for a UE closest to the network node or the propagation delay of the UE corresponding to an arrival of the PRACH preamble within the preamble receiving window.

Example 20

The method of example 18, further comprising starting a random access response (RAR) window twice a maximum propagation delay after transmitting the PRACH preamble, the maximum propagation delay corresponding to a longest propagation delay for a UE farthest from the network node.

Example 21

The method of any of the preceding examples, further comprising skipping one RACH occasion in response to a gap between two RACH occasions being less than or equal to a difference between a maximum propagation delay and the propagation delay.

Example 22

An apparatus comprising at least one means for performing a method of any of examples 1 to 21.

Example 23

An apparatus for wireless communications comprising a processor and memory coupled to the processor, the processor and memory configured to perform a method of any of examples 1 to 21.

Example 24

A non-transitory computer-readable medium storing code for wireless communications, the code comprising instructions executable by a processor to perform a method of any of examples 1 to 21.

Example 25

A method of wireless communication by a network node in a non-terrestrial network (NTN), comprising: transmitting, to a user equipment (UE), information for estimating a propagation delay between the UE and the network node; and receiving, from the UE, a physical random access channel (PRACH) preamble a user specific timing advance period after the UE transmits the PRACH preamble, the user specific timing advance period corresponding to the propagation delay.

Example 26

The method of example 25, wherein the propagation delay comprises a first delay between the UE and a satellite and a second delay between the satellite and the network node.

Example 27

The method of any of examples 25 or 26, further comprising scheduling an uplink shared channel resource after the user specific timing advance period, which is indicated in a random access response (RAR) message, the uplink shared channel scheduled later than a start of a RAR window delayed by twice a maximum propagation delay plus one of a time of the RAR window or a configured UE time offset, the maximum propagation delay corresponding to a longest propagation delay for a UE farthest from the network node.

Example 28

The method of any of examples 25-27, further comprising scheduling an uplink shared channel resource periodically after the user specific timing advance period, via a random access response (RAR) message, after an end of the RAR message or a random access response (RAR) window delayed by a minimum propagation delay, the minimum propagation delay corresponding to a shortest propagation delay for a closest UE to the network node.

Example 29

The method of example 28, wherein the RAR message comprises a plurality of uplink grants based at least in part on the propagation delay.

Example 30

The method of any of examples 25 or 26, further comprising scheduling an uplink shared channel resource periodically via radio resource control (RRC) signaling or via a system information block (SIB), or as a common configuration.

Example 31

The method of any of examples 25-30, further comprising: grouping UEs into preamble groups based at least in part on the propagation delay for each UE; receiving the PRACH preamble based on a preamble group; and scheduling an uplink shared channel resource in a random access response (RAR) message based on the preamble group.

Example 32

An apparatus comprising at least one means for performing a method of any of examples 25 to 31.

Example 33

An apparatus for wireless communications comprising a processor and memory coupled to the processor, the processor and memory configured to perform a method of any of examples 25 to 31.

Example 34

A non-transitory computer-readable medium storing code for wireless communications, the code comprising instructions executable by a processor to perform a method of any of examples 25 to 31.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed.

What is claimed is:

1. A method of wireless communication by a user equipment (UE), comprising:
   receiving information to estimate a propagation delay between the UE and a network node accessed via non-terrestrial communications;
   transmitting, to the network node, a physical random access channel (PRACH) preamble a user specific timing advance period before a random access channel (RACH) occasion at the UE, the user specific timing advance period corresponding to the propagation delay between the UE and the network node; and
   receiving a grant for an uplink shared channel, the uplink shared channel scheduled later than a start of a RAR window delayed by twice a maximum propagation delay in addition to a UE time offset, the maximum propagation delay corresponding to a cell specific longest propagation delay for a UE that is located farthest from the network node, the maximum propagation delay being a same delay for all UEs within a cell.

2. The method of claim 1, wherein the receiving information to estimate comprises receiving information to estimate the propagation delay based at least in part on timing information included in system information.

3. The method of claim 1, wherein the receiving information to estimate comprises receiving information to estimate the propagation delay based on a time stamp of a message received from the network node and a time of reception of the message, the time of reception based on a reference time acquired from a non-terrestrial network.

4. The method of claim 1, wherein the receiving information to estimate comprises receiving information to estimate the propagation delay based at least in part on satellite ephemeris data and a location of the UE.

5. The method of claim 1, further comprising starting a random access response (RAR) window at a first physical downlink control channel (PDCCH) occasion after a multiple of a duration of the propagation delay from transmitting the PRACH preamble.

6. The method of claim 5, wherein the multiple of the duration of the propagation delay between the UE and the network node is twice the duration of the propagation delay between the UE and the network node.

7. The method of claim 1, wherein the propagation delay comprises a first delay between the UE and a satellite and a second delay between the satellite and the network node.

8. The method of claim 1, further comprising entering a sleep state after transmitting the PRACH preamble, the sleep state lasting for a multiple of a duration of the propagation delay until starting a random access response (RAR) window.

9. The method of claim 1, further comprising entering a sleep state after receiving a random access response (RAR) message from the network node until transmitting an uplink message.

10. The method of claim 1, wherein the network node comprises one of a satellite or a base station communicating with the UE via the satellite.

11. The method of claim 1, further comprising receiving, from the network node, a grant for the uplink shared channel via radio resource control (RRC) signaling or via a system information block (SIB), or as a common configuration.

12. The method of claim 1, further comprising:
receiving an indication of a grouping for the UE based at least in part on the propagation delay;
transmitting the PRACH preamble based on the grouping; and
receiving the uplink shared channel in a random access response (RAR) message based on the grouping.

13. The method of claim 1, wherein transmitting the PRACH preamble occurs at a UE specific RACH occasion.

14. The method of claim 13, further comprising starting the random access response (RAR) window a time period after transmitting the PRACH preamble, the time period for delaying the RAR window comprising twice a selected propagation delay in addition to a duration of a preamble receiving window, the selected propagation delay corresponding to a shortest propagation delay for a UE closest to the network node or the propagation delay of the UE corresponding to an arrival of the PRACH preamble within the preamble receiving window.

15. The method of claim 13, further comprising starting the random access response (RAR) window twice the maximum propagation delay after transmitting the PRACH preamble.

16. The method of claim 1, further comprising skipping one RACH occasion in response to a gap between two RACH occasions being less than or equal to a difference between a maximum propagation delay and the propagation delay.

17. A method of wireless communication by a network node in a non-terrestrial network (NTN), comprising:
transmitting, to a user equipment (UE), information for estimating a propagation delay between the UE and the network node;
receiving, from the UE, a physical random access channel (PRACH) preamble a user specific timing advance period after the UE transmits the PRACH preamble, the user specific timing advance period corresponding to the propagation delay between the UE and the network node; and
transmitting a grant for an uplink shared channel, the uplink shared channel scheduled later than a start of a random access response (RAR) window delayed by twice a maximum propagation delay in addition to a UE time offset, the maximum propagation delay corresponding to a cell specific longest propagation delay for a UE that is located farthest from the network node, the maximum propagation delay being a same delay for all UEs within a cell.

18. The method of claim 17, wherein the propagation delay comprises a first delay between the UE and a satellite and a second delay between the satellite and the network node.

19. The method of claim 17, further comprising scheduling the uplink shared channel via radio resource control (RRC) signaling or via a system information block (SIB), or as a common configuration.

20. The method of claim 17, further comprising:
grouping UEs into preamble groups based at least in part on the propagation delay for each UE;
receiving the PRACH preamble based on a preamble group; and
scheduling the uplink shared channel in a random access response (RAR) message based on the preamble group.

21. An apparatus for wireless communication at a user equipment (UE), comprising:
at least one processor; and
a memory coupled to the processor, the processor and the memory configured to:
receive information to estimate a propagation delay between the UE and a network node accessed via non-terrestrial communications;
transmit, to the network node, a physical random access channel (PRACH) preamble a user specific timing advance period before a random access channel (RACH) occasion at the UE, the user specific timing advance period corresponding to the propagation delay between the UE and the network node; and
receive a grant for an uplink shared channel, the uplink shared channel scheduled later than a start of a RAR window delayed by twice a maximum propagation delay in addition to a UE time offset, the maximum propagation delay corresponding to a cell specific longest propagation delay for a UE that is located farthest from the network node, the maximum propagation delay being a same delay for all UEs within a cell.

22. An apparatus for wireless communication at a network node in a non-terrestrial network (NTN), comprising:
- at least one processor; and
- a memory coupled to the processor, the processor and the memory configured to:
  - transmit, to a user equipment (UE), information for estimating a propagation delay between the UE and the network node;
- receive, from the UE, a physical random access channel (PRACH) preamble a user specific timing advance period after the UE transmits the PRACH preamble, the user specific timing advance period corresponding to the propagation delay between the UE and the network node; and
  - transmit a grant for an uplink shared channel, the uplink shared channel scheduled later than a start of a random access response (RAR) window delayed by twice a maximum propagation delay in addition to a UE time offset, the maximum propagation delay corresponding to a cell specific longest propagation delay for a UE that is located farthest from the network node, the maximum propagation delay being a same delay for all UEs within a cell.

* * * * *